US009665910B2

(12) United States Patent
Chalfant et al.

(10) Patent No.: US 9,665,910 B2
(45) Date of Patent: May 30, 2017

(54) SYSTEM AND METHOD FOR PROVIDING CUSTOMIZED SAFETY FEEDBACK

(75) Inventors: Scott Chalfant, Andover, CT (US); Steven Fernandes, West Hartford, CT (US); John J. Anthony, Norwich, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 987 days.

(21) Appl. No.: 12/369,457

(22) Filed: Feb. 11, 2009

(65) Prior Publication Data
US 2009/0210257 A1 Aug. 20, 2009

Related U.S. Application Data

(60) Provisional application No. 61/030,117, filed on Feb. 20, 2008, provisional application No. 61/075,997, filed on Jun. 26, 2008.

(51) Int. Cl.
G06Q 40/08 (2012.01)
B60W 40/09 (2012.01)
G06Q 20/00 (2012.01)
B60W 40/08 (2012.01)

(52) U.S. Cl.
CPC .............. G06Q 40/08 (2013.01); B60W 40/09 (2013.01); B60W 2040/0818 (2013.01)

(58) Field of Classification Search
CPC ..... G06Q 50/30; A61B 5/0022; A61B 5/1118; A61B 5/7275; A61B 5/486
USPC ........................................................... 705/4
See application file for complete search history.

(56) References Cited

U.S. PATENT DOCUMENTS

| 4,667,336 A | 5/1987 | Best |
| 4,975,840 A | 12/1990 | DeTore et al. |
| 5,613,072 A | 3/1997 | Hammond et al. |
| 5,635,693 A | 6/1997 | Benson et al. |
| 5,664,109 A | 9/1997 | Johnson et al. |
| 5,680,329 A | 10/1997 | Lloyd et al. |
| 5,712,984 A | 1/1998 | Hammond et al. |
| 5,794,216 A | 8/1998 | Brown |
| 5,796,932 A | 8/1998 | Fox et al. |
| 5,797,134 A | 8/1998 | McMillan et al. |

(Continued)

FOREIGN PATENT DOCUMENTS

| EP | 0155779 A1 | 9/1985 |
| EP | 1145163 A2 | 10/2001 |

(Continued)

OTHER PUBLICATIONS

"California One Step Closer to Pay-As-You-Drive", retrieved from the Internet on Dec. 31, 2009 at www.carinsurancelist.com/news-pay-as-you-go. . . .

(Continued)

Primary Examiner — Kito R Robinson
Assistant Examiner — Irene Kang
(74) Attorney, Agent, or Firm — Howard IP Law Group, PC

(57) ABSTRACT

The present invention relates generally to systems and methods for monitoring driving behavior and providing feedback to the driver. The systems evaluate driving behavior and relay feedback to the driver in a fashion that is customized to take into account individual characteristics and demographic characteristics of the driver.

33 Claims, 7 Drawing Sheets

(56) References Cited

U.S. PATENT DOCUMENTS

| | | |
|---|---|---|
| 5,825,283 A | 10/1998 | Camhi |
| 5,842,148 A | 11/1998 | Prendergast et al. |
| 5,873,066 A | 2/1999 | Underwood et al. |
| 5,926,800 A | 7/1999 | Baronowski et al. |
| 5,950,150 A | 9/1999 | Lloyd et al. |
| 5,970,464 A | 10/1999 | Apte et al. |
| 5,991,733 A | 11/1999 | Aleia et al. |
| 6,014,632 A | 1/2000 | Gamble et al. |
| 6,064,970 A | 5/2000 | McMillan et al. |
| 6,067,488 A | 5/2000 | Tano |
| 6,078,857 A | 6/2000 | Jung et al. |
| 6,112,225 A | 8/2000 | Kraft et al. |
| 6,154,658 A | 11/2000 | Caci |
| 6,163,277 A | 12/2000 | Gehlot |
| 6,163,770 A | 12/2000 | Gamble et al. |
| 6,182,048 B1 | 1/2001 | Osborn et al. |
| 6,204,757 B1 | 3/2001 | Evans et al. |
| 6,211,777 B1 | 4/2001 | Greenwood et al. |
| 6,223,125 B1 | 4/2001 | Hall |
| 6,246,934 B1 | 6/2001 | Otake et al. |
| 6,307,965 B1 | 10/2001 | Aggarwal et al. |
| 6,317,718 B1 | 11/2001 | Fano |
| 6,389,340 B1 | 5/2002 | Rayner |
| 6,502,020 B2 | 12/2002 | Lang |
| 6,563,423 B2 | 5/2003 | Smith |
| 6,583,734 B2 | 6/2003 | Bates et al. |
| 6,594,579 B1 | 7/2003 | Lowrey et al. |
| 6,611,740 B2 | 8/2003 | Lowrey et al. |
| 6,633,820 B2 | 10/2003 | Bizar |
| 6,636,790 B1 | 10/2003 | Lightner et al. |
| 6,643,578 B2 | 11/2003 | Levine |
| 6,684,189 B1 | 1/2004 | Ryan et al. |
| 6,710,738 B2 | 3/2004 | Allen, Jr. |
| 6,732,031 B1 | 5/2004 | Lowrey et al. |
| 6,735,525 B1 | 5/2004 | Murphy |
| 6,754,485 B1 | 6/2004 | Obradovich et al. |
| 6,756,915 B2 | 6/2004 | Choi |
| 6,767,330 B2 | 7/2004 | Lavery et al. |
| 6,768,417 B2 | 7/2004 | Kuragaki et al. |
| 6,795,759 B2 | 9/2004 | Doyle |
| 6,823,258 B2 | 11/2004 | Ukai et al. |
| 6,832,141 B2 | 12/2004 | Skeen et al. |
| 6,839,305 B2 | 1/2005 | Perlman et al. |
| 6,853,956 B2 | 2/2005 | Ballard, Jr. et al. |
| 6,868,339 B2 | 3/2005 | Murphy et al. |
| 6,868,386 B1 | 3/2005 | Henderson et al. |
| 6,871,199 B1 | 3/2005 | Binnig et al. |
| 6,917,952 B1 | 7/2005 | Dailey et al. |
| 6,920,379 B2 | 7/2005 | Miyamoto |
| 6,925,425 B2 | 8/2005 | Remboski et al. |
| 6,931,309 B2 | 8/2005 | Phelan et al. |
| 6,950,013 B2 | 9/2005 | Scaman et al. |
| 6,957,133 B1 | 10/2005 | Hunt et al. |
| 6,965,326 B2 | 11/2005 | Allison |
| 6,968,453 B2 | 11/2005 | Doyle et al. |
| 6,973,319 B2 | 12/2005 | Ormson |
| 6,974,414 B2 | 12/2005 | Victor |
| 6,977,612 B1 | 12/2005 | Bennett |
| 6,985,922 B1 | 1/2006 | Bashen et al. |
| 6,987,964 B2 | 1/2006 | Obradovich et al. |
| 7,017,142 B1 | 3/2006 | Ehnebuske et al. |
| 7,039,592 B1 | 5/2006 | Yegge et al. |
| 7,069,118 B2 | 6/2006 | Coletrane et al. |
| 7,072,841 B1 | 7/2006 | Pednault |
| 7,107,285 B2 | 9/2006 | Von Kaenel et al. |
| 7,114,376 B2 | 10/2006 | Loucks et al. |
| 7,124,088 B2 | 10/2006 | Bauer et al. |
| 7,215,255 B2 | 5/2007 | Grush |
| 7,363,308 B2 | 4/2008 | Dillon et al. |
| 7,389,178 B2 | 6/2008 | Raz et al. |
| 7,398,202 B2 | 7/2008 | Suzuki et al. |
| 7,561,054 B2 | 7/2009 | Raz et al. |
| 7,624,031 B2 | 11/2009 | Simpson et al. |
| 8,140,358 B1 * | 3/2012 | Ling ................. G06Q 40/08 340/439 |
| 2001/0039509 A1 | 11/2001 | Dar et al. |
| 2001/0042024 A1 | 11/2001 | Rogers |
| 2001/0044733 A1 | 11/2001 | Lee et al. |
| 2002/0002475 A1 | 1/2002 | Freedman et al. |
| 2002/0010601 A1 | 1/2002 | Taylor |
| 2002/0013717 A1 | 1/2002 | Ando et al. |
| 2002/0052765 A1 | 5/2002 | Taylor |
| 2002/0055861 A1 | 5/2002 | King et al. |
| 2002/0055903 A1 | 5/2002 | Solomon |
| 2002/0072958 A1 | 6/2002 | Yuyama et al. |
| 2002/0087364 A1 | 7/2002 | Lerner et al. |
| 2002/0091550 A1 | 7/2002 | White et al. |
| 2002/0099596 A1 | 7/2002 | Geraghty |
| 2002/0103622 A1 | 8/2002 | Burge |
| 2002/0111725 A1 | 8/2002 | Burge |
| 2002/0115423 A1 | 8/2002 | Hatae et al. |
| 2002/0128882 A1 | 9/2002 | Nakagawa et al. |
| 2002/0147617 A1 | 10/2002 | Schoenbaum et al. |
| 2002/0161609 A1 | 10/2002 | Zizzamia et al. |
| 2002/0165739 A1 | 11/2002 | Guyan et al. |
| 2002/0173885 A1 | 11/2002 | Lowrey et al. |
| 2002/0178033 A1 | 11/2002 | Yoshioka et al. |
| 2002/0194033 A1 | 12/2002 | Huff |
| 2002/0194113 A1 | 12/2002 | Lof et al. |
| 2002/0198801 A1 | 12/2002 | Dixon et al. |
| 2003/0009357 A1 | 1/2003 | Pish |
| 2003/0028406 A1 | 2/2003 | Herz et al. |
| 2003/0033057 A1 | 2/2003 | Kallestad |
| 2003/0040934 A1 | 2/2003 | Skidmore et al. |
| 2003/0061075 A1 | 3/2003 | Heckman et al. |
| 2003/0093366 A1 | 5/2003 | Halper et al. |
| 2003/0101080 A1 | 5/2003 | Zizzamia et al. |
| 2003/0105651 A1 | 6/2003 | Gendelman |
| 2003/0135395 A1 | 7/2003 | Carfi et al. |
| 2003/0139948 A1 | 7/2003 | Strech |
| 2003/0154009 A1 | 8/2003 | Basir et al. |
| 2003/0158751 A1 | 8/2003 | Suresh et al. |
| 2003/0158758 A1 | 8/2003 | Kanazawa et al. |
| 2003/0171956 A1 | 9/2003 | Cox et al. |
| 2003/0187702 A1 | 10/2003 | Bonissone et al. |
| 2003/0187704 A1 | 10/2003 | Hashiguchi et al. |
| 2003/0221118 A1 | 11/2003 | Walker |
| 2003/0229522 A1 | 12/2003 | Thompson et al. |
| 2003/0233261 A1 | 12/2003 | Kawahara et al. |
| 2003/0233278 A1 | 12/2003 | Marshall |
| 2003/0233323 A1 | 12/2003 | Bilski et al. |
| 2004/0036601 A1 | 2/2004 | Obradovich |
| 2004/0039586 A1 | 2/2004 | Garvey et al. |
| 2004/0039611 A1 | 2/2004 | Hong et al. |
| 2004/0103002 A1 | 5/2004 | Colley et al. |
| 2004/0117217 A1 | 6/2004 | Reber et al. |
| 2004/0138927 A1 | 7/2004 | Eydeland et al. |
| 2004/0139034 A1 | 7/2004 | Farmer |
| 2004/0148201 A1 | 7/2004 | Smith et al. |
| 2004/0153362 A1 * | 8/2004 | Bauer ................. G06Q 40/02 705/4 |
| 2004/0153762 A1 | 8/2004 | Flynn et al. |
| 2004/0181495 A1 | 9/2004 | Grush |
| 2004/0186753 A1 | 9/2004 | Kim et al. |
| 2004/0199410 A1 | 10/2004 | Feyen et al. |
| 2004/0215494 A1 | 10/2004 | Wahlbin et al. |
| 2004/0220784 A1 | 11/2004 | Stephenson et al. |
| 2004/0220837 A1 | 11/2004 | Bonissone et al. |
| 2004/0220838 A1 | 11/2004 | Bonissone et al. |
| 2004/0220839 A1 | 11/2004 | Bonissone et al. |
| 2004/0220840 A1 | 11/2004 | Bonissone et al. |
| 2004/0225535 A1 | 11/2004 | Bond et al. |
| 2004/0225557 A1 | 11/2004 | Phelan et al. |
| 2004/0236596 A1 | 11/2004 | Chowdhary et al. |
| 2004/0236611 A1 | 11/2004 | Bonissone et al. |
| 2004/0236676 A1 | 11/2004 | Takezawa et al. |
| 2004/0243450 A1 | 12/2004 | Bernard et al. |
| 2004/0249557 A1 | 12/2004 | Harrington et al. |
| 2004/0249679 A1 | 12/2004 | Henderson et al. |
| 2004/0260579 A1 | 12/2004 | Tremiti |
| 2004/0267577 A1 | 12/2004 | Nakai |
| 2005/0021360 A1 | 1/2005 | Miller et al. |
| 2005/0038682 A1 | 2/2005 | Gandee et al. |
| 2005/0055248 A1 | 3/2005 | Helitzer et al. |

(56) References Cited

U.S. PATENT DOCUMENTS

| | | |
|---|---|---|
| 2005/0055249 A1 | 3/2005 | Helitzer et al. |
| 2005/0060207 A1 | 3/2005 | Weidner et al. |
| 2005/0065682 A1 | 3/2005 | Kapadia et al. |
| 2005/0070299 A1 | 3/2005 | Caspi et al. |
| 2005/0071202 A1 | 3/2005 | Kendrick |
| 2005/0075067 A1 | 4/2005 | Lawson et al. |
| 2005/0086084 A1 | 4/2005 | Dillard |
| 2005/0091080 A1 | 4/2005 | Biats, Jr. |
| 2005/0091085 A1 | 4/2005 | Colley et al. |
| 2005/0091175 A9 | 4/2005 | Farmer |
| 2005/0102172 A1 | 5/2005 | Sirmans |
| 2005/0108063 A1 | 5/2005 | Madill et al. |
| 2005/0108065 A1 | 5/2005 | Dorfstatter |
| 2005/0108066 A1 | 5/2005 | Weidner et al. |
| 2005/0125259 A1 | 6/2005 | Annappindi |
| 2005/0131742 A1 | 6/2005 | Hoffman et al. |
| 2005/0137757 A1 | 6/2005 | Phelan et al. |
| 2005/0137912 A1 | 6/2005 | Rao et al. |
| 2005/0171885 A1 | 8/2005 | Christman et al. |
| 2005/0174217 A1 | 8/2005 | Basir et al. |
| 2005/0182538 A1 | 8/2005 | Phelan et al. |
| 2005/0192730 A1 | 9/2005 | Churchill et al. |
| 2005/0192850 A1 | 9/2005 | Lorenz |
| 2005/0216583 A1 | 9/2005 | Cole et al. |
| 2005/0222867 A1 | 10/2005 | Underwood et al. |
| 2005/0228692 A1 | 10/2005 | Hodgdon |
| 2005/0234742 A1 | 10/2005 | Hodgdon |
| 2005/0240451 A1 | 10/2005 | Johnson et al. |
| 2005/0276401 A1 | 12/2005 | Madill et al. |
| 2005/0278082 A1 | 12/2005 | Weekes |
| 2005/0285748 A1 | 12/2005 | Pedraza et al. |
| 2006/0000420 A1 | 1/2006 | Martin Davies |
| 2006/0009289 A1 | 1/2006 | McCarten et al. |
| 2006/0015253 A1 | 1/2006 | Ochs et al. |
| 2006/0015360 A1 | 1/2006 | Ochs et al. |
| 2006/0015373 A1 | 1/2006 | Cuypers |
| 2006/0015374 A1 | 1/2006 | Ochs et al. |
| 2006/0033625 A1 | 2/2006 | Johnson et al. |
| 2006/0036473 A1 | 2/2006 | Taylor |
| 2006/0053038 A1 | 3/2006 | Warren et al. |
| 2006/0064332 A1 | 3/2006 | Schoenbaum et al. |
| 2006/0106515 A1 | 5/2006 | Phelan et al. |
| 2006/0111817 A1 | 5/2006 | Phelan et al. |
| 2006/0122749 A1 | 6/2006 | Phelan et al. |
| 2006/0136273 A1 | 6/2006 | Zizzamia et al. |
| 2006/0165040 A1 | 7/2006 | Rathod et al. |
| 2006/0187889 A1 | 8/2006 | Mehta et al. |
| 2006/0200008 A1* | 9/2006 | Moore-Ede ............ B60K 28/06 600/300 |
| 2006/0232398 A1 | 10/2006 | Nedblake et al. |
| 2006/0242046 A1 | 10/2006 | Haggerty et al. |
| 2006/0253307 A1 | 11/2006 | Warren et al. |
| 2006/0259333 A1 | 11/2006 | Pyburn |
| 2006/0287892 A1 | 12/2006 | Jones et al. |
| 2007/0005404 A1 | 1/2007 | Raz et al. |
| 2007/0016500 A1 | 1/2007 | Chatterji et al. |
| 2007/0016508 A1 | 1/2007 | Lapointe et al. |
| 2007/0021987 A1 | 1/2007 | Binns et al. |
| 2007/0027726 A1 | 2/2007 | Warren et al. |
| 2007/0043656 A1 | 2/2007 | Lancaster |
| 2007/0043662 A1 | 2/2007 | Lancaster |
| 2007/0106539 A1 | 5/2007 | Gay |
| 2007/0174082 A1 | 7/2007 | Singh |
| 2008/0255722 A1 | 10/2008 | McClellan et al. |
| 2008/0262670 A1 | 10/2008 | McClellan et al. |
| 2009/0024273 A1 | 1/2009 | Follmer et al. |
| 2009/0024419 A1 | 1/2009 | McClellan et al. |
| 2009/0040054 A1* | 2/2009 | Wang .................. B60W 30/095 340/576 |

FOREIGN PATENT DOCUMENTS

| | | |
|---|---|---|
| EP | 1160707 | 12/2001 |
| EP | 1241599 | 9/2002 |
| EP | 1313043 | 5/2003 |
| EP | 1544771 | 6/2005 |
| EP | 1583013 | 10/2005 |
| JP | 2001118175 | 4/2001 |
| JP | 2001319051 | 11/2001 |
| JP | 2002092764 | 3/2002 |
| JP | 2002109229 | 4/2002 |
| JP | 2002133117 | 5/2002 |
| JP | 2002183456 | 6/2002 |
| JP | 2002329071 | 11/2002 |
| JP | 2002373259 | 12/2002 |
| JP | 2004013234 | 1/2004 |
| JP | 2004017901 | 1/2004 |
| JP | 2004059013 | 2/2004 |
| JP | 2004078393 | 3/2004 |
| JP | 2004240688 | 8/2004 |
| WO | WO-99/21116 | 4/1999 |
| WO | WO-01/11501 | 2/2001 |
| WO | WO-0163445 A2 | 8/2001 |
| WO | WO-0163534 A2 | 8/2001 |
| WO | WO-03058381 A2 | 7/2003 |
| WO | WO-03065268 A1 | 8/2003 |
| WO | WO-03/090130 | 10/2003 |
| WO | WO-2004100043 A1 | 11/2004 |
| WO | WO-2004102536 A2 | 11/2004 |
| WO | WO-2006028484 A1 | 3/2006 |
| WO | WO-2006130146 A1 | 12/2006 |

OTHER PUBLICATIONS

Final Office Action dated Jan. 11, 2010 in U.S. Appl. No. 11/903,927.

Final Office Action dated Jan. 7, 2010 in U.S. Appl. No. 11/642,330.

Non-Final Office Action dated Nov. 20, 2009 in U.S. Appl. No. 11/894,049.

Proposition 103, California Department of Insurance, retrieved from the internet on Dec. 31, 2009 at www.insurance.ca.gov/.../prop-103.cfm.

AIG Auto Insurance Launches GPS Based Teen Driver Pilot Program. (Apr. 9, 2007).

Antonio et al. North American Actuarial Journal. 10:1, 30-48. Lognormal Mixed Models for Reported Claims Reserves. (Jan. 2006).

Apte et al. Business Applications of Data Mining. Communications of the CAM. 45:8, 49-53. (2002).

Apte et al. Data-intensive analytics for predictive modeling. IBM Journal of Research and Development. 47:1, 17-23 (Jan. 2003).

Apte et al. Insurance Risk Modeling Using Data Mining Technology. Research Report RC21314 (94531). (1999).

Apte et al. A probabilistic estimation framework for predictive modeling analytics. IBM Systems Journal. 41:3, 438-48. (2002).

Axelrod et al. Predictive Modeling in Health Plans. Abstract from Disease Management & Health Outcomes, 11:779-87(9). (Nov. 2003).

Butler et al. Driver Record: A Political Red Herring That Reveals the Basic Flaw in Automobile Insurance Pricing. J. of Insurance Regulation. 8:2, 200-234 (1989).

CAS Data Management and Information Educational Materials Working Party. Survey of Data Management and Data Quality Texts. Casualty Actuarial Society Forum, pp. 273-306. (Winter 2007).

Chittim, G. Insure as you drive. KING5 News for Seattle. (Mar. 27, 2007).

Conger et al. Emphasis 2006/4. Predictive Modeling in Workers Compensation. pp. 18-21.

D'Arcy, Stephen P. Paper presented at World Risk and Insurance Economics Congress. Predictive Modeling in Automobile Insurance: A Preliminary Analysis. (2005).

de Alba, Enrique. Bayesian Estimation of Outstanding Claims Reserves. No. Ameri. Actuarial J. 6:4, 1-20. (2002).

Deloitte & Touche. Advanced analytics and the art of underwriting: Transforming the insurance industry.

Derrig et al. Comparison of Methods and Software for Modeling Nonlinear Dependencies: A Fraud Application. (2006).

(56) References Cited

OTHER PUBLICATIONS

Dorn et al. Insurance Industry Databases. Database. 21:5, 68-71. (1998).
Ellingsworth et al. DM Review. Text Mining Improves Business Intelligence and Predictive Modeling in Insurance. (Jul. 2003).
Ellis et al. Applying Diagnosis-Based Predictive Models to Group Underwriting. Society of Actuaries, Issue 46, 1-7. (Aug. 2003).
Fellingham et al. Comparing Credibility Estimates of Health Insurance Claims Costs. No. Ameri. Actuarial J. 9:1, 1-12. (2005).
Fetterolf, Don. Paradise Lost: Return on Investment in Disease Management. Health Watch. Issue 52, pp. 14-17. (May 2006).
Francis Analytics and Actuarial Data Mining. Predictive Modeling Workshop presentation: Training for development and deployment.
Gallagher, C. Risk Classification Aided by New Software Tool. National Underwriter. 17, p. 19. 1992.
German, J. Portable structure tester may bring better-built homes, shopping malls, skyscrapers. Sandia Lab News. 51:2. Jan. 29, 1999. [Retrieved on Jan. 23, 2008]. Retrieved from Internet URL: <http://www.sandia.gov/LabNews/LN01-29-99/aser_story.htm>.
Grimes, Seth. The Word on Text Mining. Presentation. Portals, Collaboration, and Content Management. (Apr. 14, 2005).
Guszcza et al. Predictive Modeling for Property-Casualty Insurance. Presentation to SoCal Actuarial Club. (Sep. 22, 2004).
Guven, Serhat. Predictive Modeling. Future Fellows. (Jun. 2006).
Hong, S.J. et al. IBM Research Report RC-21570. Advances in Predictive Model Generation for Data Mining. (1999).
Insurance Newscast Press Release. "Predictive Modeling Raises Opportunities and Issues for Actuaries and Insurers, CAS Meeting is Told." (Dec. 15, 2005).
IrisNet: The 'Seeing' Internet. Retrieved from www.intel.com (2005).
Johnston, J. Vehicle's Black Box Holds Key to Crash (May 21, 2003). Retrieved from http://news.tbo.com.
Litman, T. Distance-Based Vehicle Insurance Feasibility, Costs and Benefits. Comprehensive Technical Report). Victoria Transport Policy Institute. (Jul. 8, 2004).
Macleod et al. Paper. Entropy-Reducing Properties of Predictive Financial Models. Aug. 27, 1992. Actuarial Research Clearing House. vol. 3 (1993).
Magnify Press Release. Magnify Applies Predictive Modeling to Worker's Comp Underwriting and Fraud Detection. Chicago, IL (Mar. 1, 2005).
Magnify Press Release. Erie Insurance Reduces Fraud Losses with FraudFocus™. Predictive Modeling Demonstrates Effectiveness for Auto, Property and Worker's Comp. (Feb. 4, 2005).
Meyers, Glenn. On Predictive Modeling for Claim Severity. Casualty Actuarial Society Forum. pp. 215-253. (Spring 2005).
Morgan et al. Conjugate Bayesian Analysis of the Negative Binomial Distribution. Actuarial Research Clearing House. vol. 1, pp. 97-118, (1993).
Mosley, R. The Use of Predictive Modeling in the Insurance Industry. Pinnacle Actuarial Resources Inc. (Jan. 2005).
Muller, Stacey. Predictive Modeling: Using Claims Data to Find Trends and Cost Drivers. Milliman Consultant's Corner.
Nerad, Jack. Insurance by the mile. (Dec. 22, 2004) Retrieved from http://www.drivers.com.
Pednault et al. IBM Research Report RC-21731. Handling Imbalanced Data Sets in Insurance Risk Modeling. (Mar. 10, 2000).
Pednault et al. IBM Research Report RC-21757. The Importance of Estimation Errors in Cost-Sensitive Learning. (Mar. 30, 2000).
Predictive Modeling Applications. Weyuker, L. & Minnich, J. Record, 31:2. New Orleans Health/Pension Spring Meeting, Session 3PD. (Jun. 2005).
Predictive Modeling—Current Practices and Future Applications. Record, 30:1. Spring Meeting, Anaheim, CA. Session 64PD. (May 2004).
Predictive Modeling. Record, 28:2. Spring Meeting, San Francisco, CA. Session 99OF. (Jun. 2002).
Riegel et al. Insurance Principles and Practices, Prentice-Hall, Inc. pp. i-xi (1921).
Roberts, Gregory. Seattle Post-Intelligencer. Drive less during rush hour, get a lower insurance rate. (Mar. 27, 2007).
Rosella Data Mining & Database Analytics. Downloaded from www.roselladb.com/insurance-risk-analysis.htm.
Rosella Data Mining & Predictive Analytics. Predicting Modeling Software. Downloaded from www.roselladb.com/predictive-modeling.htm.
Rosenberg et al. Predictive Modeling with Longitudinal Data: A Case Study of Wisconsin Nursing Homes. (Feb. 4, 2006).
Roudebush et al. Converting Clinical Literature to an Insured Population: A Comparison of Models Using NHANES. No. Ameri. Actuarial J. 6:4, 55-66. (2002).
Sanche et al. Variable Reduction for Predictive Modeling with Clustering. Casualty Actuarial Society Forum, pp. 89-100. (Winter 2006).
Sharp, Keith P. Aspects of Interest Rate Models. Actuarial Research Clearing House. vol. 1, pp. 433-457. (Aug. 25, 1990).
Steed, Judy. Winning Ways. Toronto Star, p. 3-4 (May 21, 2007).
Stehno, Chris E. What We Have Learned in the Last 50 Years—and Aren't Using. Health Watch. Issue 52, pp. 18-21. (May 2006).
Table of Contents of White Paper. Predictive Modeling in Insurance: An insurance industry executive briefing. SAS (Predictive Modeling in Insurance), publisher. (Mar. 23, 2007).
The Lowdown Ways to Reduce the Premium on Homeowner's Insurance; [Chicago Sports Final Edition] Diana McCabe, Knight Ridder/Tribune. Chicago Tribune. Chicago, IL: Aug. 25, 2000. p. 28 [Retrieved from Internet Apr. 27, 2007].
Vickrey, William. Automobile Accidents, Tort Law, Externalities, and Insurance: An Economist's Critique. Orig. pub. in Law and Contemporary Problems, 33:464-87 (1968).
Wang, Wei. Thesis. Predictive Modeling Based on Classification and Pattern Matching Methods. (May 1999).
Wenzel, T. Analysis of National Pay-As-You-Drive Insurance Systems and Other Variable Driving Charges. Lawrence Berkeley Lab., Univ. of Calif. (Jul. 1995).
Werner et al. GLM Basic Modeling: Avoiding Common Pitfalls. Casualty Actuarial Society Forum. pp. 257-272. (Winter 2007).
Wolak, Dan. An Actuarial Response to the Health-Care Crisis. Society of Actuaries. Issue 47, 1-9. (Apr. 2004).
Woodfield, Terry J. Paper 13-26. Predictive Modeling in the Insurance Industry Using SAS Software.
Woodfield, Terry J. Paper 071-30. Predicting Workers' Compensation Insurance Fraud Using SAS® Enterprise Miner™ 5.1 and SAS® Text Miner. 2004.
Woodley et al. Assessing Predictive Modeling Tools for Pricing and Underwriting. Health Watch. Issue 51, pp. 30-33. (Jan. 2006).
Wu et al. Paper. Casualty Actuarial Society Forum. pp. 113-138. Does Credit Score Really Explain Insurance Losses? Multivariate Analysis from a Data Mining Point of View. 2003.
Wu, Cheng-sheng Peter et al. A View Inside the "Black Box:" A Review and Analysis of Personal Lines Insurance Credit Scoring Models Filed in the State of Virginia. Casualty Actuarial Society Forum, pp. 251-290 (Winter 2004).
Young, Virginia R. Actuarial Research Clearing House. vol. 1. Robust Bayesian Credibility Using Semiparametric Models. (1999).
Derrig, R. et al. Distinguishing the Forest from the Trees: A Comparison of Tree Based Data Mining Methods. Casualty Actuarial Society Forum. pp. 1-49 (Winter 2006).
Francis, Louise A. Taming Text: An Introduction to Text Mining. Casualty Actuarial Society Forum. pp. 51-88 (Winter 2006).
McGinty, Bill, "Protecting teenage drivers from themselves", 10Connects.com, Tampa Bay's 10 News. (Sep. 23, 2006).
Phua, C. et al. A Comprehensive Survey of Data Mining-based Fraud Detection Research. Paper (Sep. 2, 2005).
Popowich, Fred. Using Text Mining and Natural Language Processing for Health Care Claims Processing. SIGKDD Explorations. 7:1, 59-66 (Jun. 2005).
Rejda, Principles of Insurance, Longman Higher Education, 3rd ed., p. 230, May 1989.

(56) References Cited

OTHER PUBLICATIONS

Tkach, Daniel S. Information Mining with the IBM Intelligent Miner Family. (An IBM Software Solutions White Paper) (Feb. 1998).

* cited by examiner

SYSTEM AND METHOD FOR PROVIDING CUSTOMIZED SAFETY FEEDBACK

CROSS REFERENCE TO RELATED APPLICATIONS

This application claims the benefit of U.S. Provisional Patent Application No. 61/075,997, filed Jun. 26, 2008, entitled "System and Method For Providing Customized Safety Feedback" and U.S. Provisional Patent Application No. 61/030,117, filed Feb. 20, 2008, entitled "System and Method For Personal Safety Monitoring and Feedback," the entirety of each of which is incorporated herein by reference.

BACKGROUND OF THE INVENTION

Various vehicle monitoring systems have been proposed for monitoring driving behavior and providing feedback to drivers and/or fleet supervisors. Similar systems have been proposed to use vehicle monitoring data to adjust insurance policy features based on such monitoring. Such systems, however, have treated all drivers alike. All drivers, however, do not pose the same risks. The risks a driver represents to him or herself and to others vary based on his or her individual characteristics, as well as on characteristics of individuals sharing similar demographics.

In addition, certain forms of feedback are more appropriate for some drivers than others. For example, some may find real-time feedback to be a distraction, increasing the risk of harm, as opposed to decreasing it. Previous monitoring systems have thus far failed to take such individual differences into account. Thus, there is a need in the art for driving monitoring and feedback systems that take into account the varied characteristics and preferences of individual drivers.

Insurance companies, when determining a premium, typically do not take into account all information that could determine whether a driver is driving safely. These "non-rating" characteristics may be useful, however, when assessing driving behavior and providing feedback thereon.

SUMMARY OF THE INVENTION

The present invention relates generally to systems for monitoring driving behavior and providing feedback to the driver. The systems evaluate driving behavior and relay feedback to the driver in a fashion that is customized to take into account rating characteristics and non-rating characteristics of the driver. The monitoring and feedback functionality is coupled with an insurance system. The insurance system is configured to adjust insurance policy terms and/or provide incentives to motivate safer driving based on the monitoring and on characteristics of the driver.

According to one aspect, the invention relates to a driver feedback system including a data store for storing a dynamic driver profile for a specific driver. The dynamic driver profile includes at least one rating characteristic and at least one non-rating characteristic. A "rating characteristic" as used herein is a characteristic on which the insurance company insuring the vehicle bases its rating of the driver at a particular point in time. The at least one rating characteristic may include, for example age, gender, driving record, compliance with feedback, annual driving mileage, vehicle use (e.g., personal or business), and the industry in which vehicle is used. In contrast, a "non-rating characteristic" as used herein is any characteristic which the insurance company insuring the vehicle does not take into account for determining an insurance premium, regardless of how relevant the non-rating characteristic might be for such a determination, at that time. Thus, whether a characteristic is a rating or a non-rating characteristic may vary from one insurer to another insurer, from one policy to another policy, or from one driver on a policy to another driver on the same policy depending on which characteristics are used for deriving a premium for a particular policy. In addition, in certain implementations, where allowable by law, during the term of a policy, an insurer may reclassify certain rating characteristics as non-rating characteristics or vice versa as new information about the driver is obtained or as characteristics of the driver change. The rating and non-rating characteristics may include safety-related demographic characteristics of the driver and at safety-related individual characteristics of the driver.

The dynamic driver profile may also include one or more preferences. The preferences may be driver preferences (i.e., preferences expressed by the driver), supervisor preferences (i.e., preferences expressed by a supervisor of the driver), or guardian preferences (i.e., preferences expressed by a guardian of the driver). The preferences may include feedback mode preferences or desired driving result preferences (such as, for example, avoiding exceeding the speed limit, improving fuel economy, and avoiding night driving.

The driver feedback system also includes a driver evaluation module for differentially evaluating the safety performance of the driver based on the rating and the non-rating characteristics in the driver's associated dynamic driver profile. The evaluation may include comparing the driving behavior to data stored in the dynamic driver profile, e.g., to identify improvements in driving over time. The driver evaluation module also generates driving feedback based on the evaluation to the dynamic feedback module for provision to the driver and may also update the dynamic driver profile based on the evaluation.

The driver feedback system may also include a server for receiving a communication of a driving characteristic from a sensor located on the vehicle and forwarding the received driving characteristic to the driver evaluation module to update a dynamic driver profile. The server or a second server may be responsible for sending the feedback to a driver. The servers may be operated by an insurance company, a third party monitoring service, the driver, a supervisor of the driver, or a guardian of the driver.

The driver evaluation system also includes a business rules module for one of adjusting features of an insurance policy of the driver and/or offering an incentive for improved driving based on the rating characteristics in the driver's dynamic driver profile and the evaluation for the driver output by the driving evaluation module. In one embodiment, the insurance policy adjustment includes an adjustment to a premium associated with the insurance policy. In another embodiment, the adjustment comprises an adjustment to a deductible associated with the insurance policy. In various embodiments, suitable incentives include, for example, offers of a reduced premium for the insurance policy or a reduced deductible for the insurance policy.

In some embodiments, the driver feedback system may also include a processor that includes a dynamic feedback module. The dynamic feedback module selects a feedback mode from a plurality of feedback modes based on the driver's dynamic driver profile and provides feedback to the driver according to the selected modes. In some embodiments, in response to the driver having a first combination rating and non-rating characteristics, the dynamic feedback module selects a pre-ride, a real-time, a periodic, or a post-ride feedback mode for providing feedback to the driver. The feedback may include an instruction for the driver to alter the driver's driving behavior, an analysis of the driver's driving behavior, and/or an incentive. The content of the feedback, in one embodiment, is also based on the characteristics of the driver. As a result, for two drivers having the same driving behavior, the dynamic feedback module outputs different feedback based on the two driver's respective dynamic driver profiles.

In some embodiments, the dynamic feedback module may generate its evaluation based on the one or more preferences included in the dynamic driver profile, including preferences of the driver, a guardian, or a supervisor.

In some embodiments, the driver evaluation module outputs a compliance level based on a driver's adherence to the driving instruction. In some embodiments, the business rules module modifies the insurance policy based on the compliance level.

According to one aspect, the invention relates to a method for providing feedback to a driver by a driver feedback system. The method includes storing, by a data store, a dynamic driver profile for a specific driver. The dynamic driver profile includes at least one rating characteristic and at least one non-rating characteristic of the driver as described above. The method includes differentially evaluating, by a driver evaluation module, the safety performance of the driver based on the rating and non-rating characteristics in the driver's associated dynamic driver profile. The method further includes generating, by the driver evaluation module, driving feedback based on the evaluation. The method also includes adjusting, by a business rules module, features of an insurance policy for a driver based on the rating characteristics in the driver's dynamic driver profile and the evaluation for the driver output by the driving evaluation module.

According to a third aspect, the invention relates to a computer readable medium storing computer readable instructions. The computer readable instructions, when executed by a processor, cause the processor to carry out a method for providing feedback to a driver. The method includes storing a dynamic driver profile for a specific driver. The dynamic driver profile includes at least one rating characteristic and at least one non-rating characteristic of the driver as described above. The method includes differentially evaluating the safety performance of the driver based on the rating and non-rating characteristics in the driver's associated dynamic driver profile. The method further includes generating driving feedback based on the evaluation. The method also includes adjusting features of an insurance policy for a driver based on the rating characteristics in the driver's dynamic driver profile and the evaluation for the driver output by the driving evaluation module.

BRIEF DESCRIPTION OF THE DRAWINGS

The invention may be better understood from the following illustrative description with reference to the following drawings.

DESCRIPTION OF CERTAIN ILLUSTRATIVE EMBODIMENTS

To provide an overall understanding of the invention, certain illustrative embodiments will now be described, including systems and methods for implementing a dynamic driver feedback system. However, it will be understood by one of ordinary skill in the art that the methods and systems described herein may be adapted and modified as is appropriate for the application being addressed and that the systems and methods described herein may be employed in other suitable applications, and that such other additions and modifications will not depart from the scope hereof.

Figure 1:
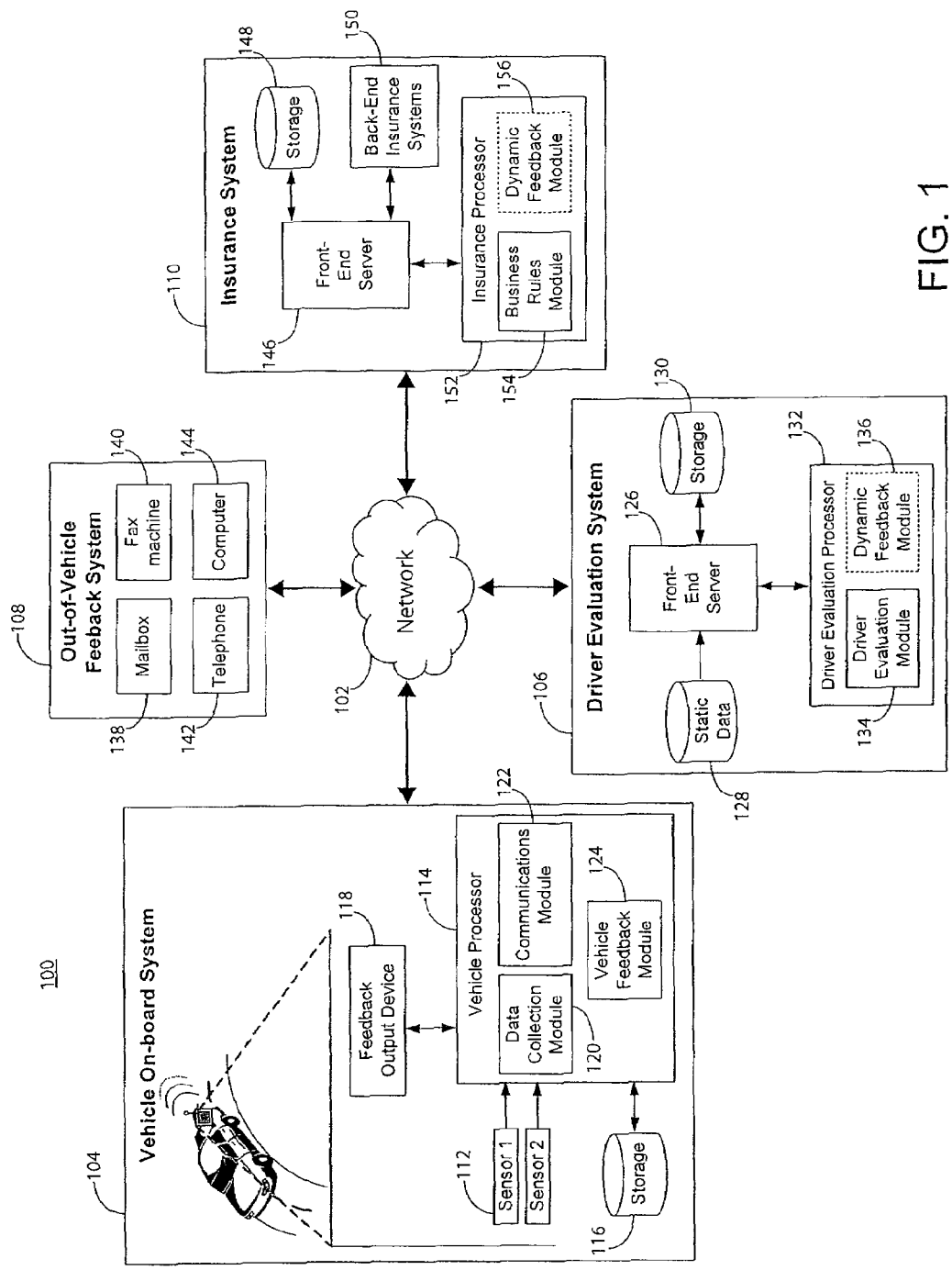
FIG. 1 is a block diagram of a system for monitoring and evaluating a driver's safety performance and using that data to provide feedback and adjust the driver's automobile insurance.

FIG. 1 is a block diagram of a system 100 for monitoring a driver's driving performance and providing feedback to the driver, according to an illustrative embodiment of the invention. The system is configured to provide two classes of feedback modes to the driver, i.e., in-vehicle and/or out-of-vehicle feedback modes. The system includes four components that are linked together by a network 102: a vehicle on-board system 104, a driver evaluation system 106, an out-of-vehicle feedback system 108, and an insurance system 110. The network 102 links the components via a combination of local and wide area networks. For example, in one embodiment, vehicles communicate with other components of the system via wireless (e.g., cellular, GSM, WiFi, or WiMax) or wired (e.g., USB, FireWire, ethernet, frame relay, or ISDN) connections.

Vehicle on-Board System

Generally, the vehicle on-board system 104 obtains data about an individual driver's driving behavior, sends in-vehicle feedback to the driver, and sends data related to the driving behavior to other components through the network 102. The vehicle on-board system 104 includes a plurality of sensors 112, a vehicle processor 114, a dynamic storage device 116, and a feedback output device 118.

The plurality of sensors 112 track vehicle event and behavioral data related to the driver's driving behavior. Examples of sensors include global positioning system (GPS) sensors to track location and speed, range finders to detect position relative to other vehicles or obstacles (e.g., to detect tailgating or potential collisions), and accelerometers to detect acceleration, braking, and cornering. Other examples of sensors include seatbelt and airbag sensors that can be accessed via a standard interface, such as OBD-II or OBD-III interfaces, cameras, which may be coupled to other vehicle systems, including, e.g., drowsiness detection systems and driver identification systems. The sensors may track other data such as lane changing and distance of trip, as well as other conditions including light level, time of day, climate conditions, road type (e.g., highway, city street, rural route), and road conditions. The plurality of sensors 112 relay the event and behavioral data to the vehicle processor 114, where it is processed to convert the raw data into behavioral and safety information (such as instances of a driver's exceeding the speed limit, tailgating, or accelerating too hard). In alternative implementations, such processing is carried out by the driver evaluation system 106.

The vehicle processor 114 includes a data collection module 120, a communications module 122, and a vehicle feedback module 124. The data collection module 120 collects data from the plurality of sensors 112. In one implementation, the data collection module selects which sensors 112 to collect data from based a dynamic driver profile associated with the current driver. Thus, for two drivers of the same vehicle, the data collection module 120 may collect sensor data from different sets of sensors 112. The communications module 122 manages communication with the other components of the vehicle processor 114 and with other components of the system 100.

The vehicle feedback module 124 controls the output of feedback messages by applying feedback instructions (identifying the feedback mode) and translating in-vehicle safety feedback messages into vehicle feedback output-device-specific output formats. For example, various in-vehicle feedback timing modes include real-time feedback, pre-ride feedback, and post-ride feedback. Presentation modes include audio feedback modes, visual feedback modes, and audiovisual feedback modes.

A vehicle may have various feedback output devices 118 for presenting feedback to drivers, including both audio and visual feedback output devices 118. Devices may vary from vehicle to vehicle. For example, various vehicles may provide audio feedback via their radios or, alternatively, stand-alone audio devices. Visual output may be provided on a video screen, for example, included with a GPS system, via selectable LEDs included in the dashboard of the vehicle, via a heads-up display, or other suitable visual output device.

To reduce the workload of the processors generating feedback messages (e.g., the dynamic feedback module 136 of the driver evaluation system 106 or the dynamic feedback module 156 of the insurance system 110), the responsibility of translating such messages into formats suited for a particular vehicle's feedback output devices, in one embodiment. is left to the vehicle feedback module 124. For example, with respect to audio feedback, feedback may be received in the form of text, along with instructions to output the feedback audibly. The vehicle feedback module 124 then converts text to speech in a format suitable for output by the vehicle's feedback output device 118. For example, if the audio feedback output device 118 is incorporated into an analog radio, the vehicle feedback module 124 converts the text into speech and outputs it at a predetermined AM or FM frequency for demodulation and output by the radio. Alternatively, if the feedback output device 118 is capable of processing digital media, the vehicle feedback module 124 converts the text into speech in the form of a digital audio file (e.g., an mp3 or a wav file) and forwards the file to the audio feedback output device 118.

If the vehicle receives the same feedback message with instructions to present the message using a real-time video feedback mode, the vehicle feedback module 124 likewise translates the message into an appropriate format for outputting to the driver based on the specific visual feedback output devices 118 incorporated into the vehicle. For example, in one embodiment, the vehicle feedback module 124 searches a look-up table using the text to identify a light to illuminate on the vehicle's dashboard. Alternatively, the vehicle feedback module 124 outputs the text in ASCII or other text format to a display screen.

If the vehicle feedback module 124 receives feedback with instructions to use a pre-ride or post-ride feedback mode, the vehicle feedback module 124 stores the feedback in the dynamic storage device 116, until the next feedback event.

In alternative implementations, feedback messages may be received in a coded format, for example, keyed to a look-up table, instead of in a text format. In still other embodiments, the vehicle feedback module 124 generates the feedback itself as described below in relation to the dynamic feedback module 136 of the driver evaluation system 106.

Suitable in-vehicle feedback can include an analysis of the driver's driving behavior, alerts to the driver to alter his or her driving behavior, notifications of potential insurance impacts of driving behavior, and/or incentives to alter or maintain certain driving behaviors. For example, in-vehicle alerts include warnings to slow down, reduce acceleration, increase the distance from behind the vehicle in front, reduce the number of lane changes, or increase braking distance. Other suitable in-vehicle feedback include warnings that premium levels or deductibles may increase if un-safe driving behavior is not modified. Alternatively, or in addition, in-vehicle feedback may include congratulatory feedback announcing favorable insurance policy feature alterations, such as premium or deductible reductions, or discounts on goods or services (e.g., offered by a monitoring service or fleet supervisor).

In addition to pre-ride and post-ride feedback, the dynamic storage device 116 can store additional information. For example, the dynamic storage device 116 can store information about the driver, feedback rules, and collected sensor data and derived behavioral and safety information until such information is transmitted to the driver evaluation system 106 or insurance system 110.

In one implementation, the vehicle on-board system 104, in coordination with the driver evaluation system 106 may take steps to initiate automatic control over certain vehicle operations. For example, in a vehicle that can operate in both two-wheel and four-wheel drive, the vehicle on-board system 104, in response to detecting a slick road surface, may automatically engage the four-wheel drive, if not already engaged. Similarly, the on-board system 104 may automatically trigger the illumination of headlights upon detecting low levels of ambient light or activation of windshield wipers. While preferably, such automatic control is limited to activation of safety features, in certain embodiments, upon receiving prior approval from the driver or the driver's guardian or supervisor, the on-board system may optionally take more direct control of driving operations upon detection of an unsafe driving environment. For example, the on-board system may automatically engage the brakes if a driver is determined to be speeding. In one particular implementation, such automatic control is not activated until a driver fails to react to feedback instructions a pre-determined number of times.

Driver Evaluation System

The driver evaluation system 106 receives driving data from the vehicle on-board system 104 via the network 102 and uses the driving data in concert with other data about the driver to evaluate and store the driver's safety performance. The driver evaluation system 106 may be operated by an insurance company insuring the vehicle or by an independent entity. Driving data may include raw data collected by the plurality of sensors 112 as well as collected data that has been processed by the vehicle processor 114.

The driver evaluation system 106 includes a front-end server 126, a static data store 128, a dynamic storage device 130, and a driver evaluation processor 132. The front-end server 126 obtains driving data from the network 102, the static data store 128, and the dynamic storage device 130, and provides it to the driver evaluation processor 132 for processing. In addition, the front-end server 126 sends data over the network 102, e.g., to the vehicle on-board system 104, the out-of-vehicle feedback system 108, and/or the insurance system 110.

The driver evaluation processor 132 includes a driver evaluation module 134 and an optional dynamic feedback module 136 (the dynamic feedback module may instead be included as part of the insurance system 110). The driver evaluation module 134 module receives driving data from the front-end server 126 and evaluates the safety performance of the driver using the driving data based on the rating and non-rating characteristics in a dynamic driver profile associated with the driver. The resulting evaluation indicates the safety of a driver's actual driving behavior. The driver evaluation module 134 also updates the dynamic driver profile based on the evaluation.

The dynamic driver profile includes one or more rating characteristics (such as, for example, age, gender, driving record, compliance with feedback, annual mileage driven, and vehicle use and one or more non-rating characteristics of the driver. Examples of non-rating characteristics may include, for example, analyses of eyesight, cognitive ability (such as reaction time and perception skills), physical fitness, other indicators of health and fitness, driver preferences and driver supervisor preferences. Two drivers who display similar driving behaviors but whose associated dynamic driving profiles differ may receive different safety performance evaluations. For example, a driver who has quick reflexes, has good eyesight, and consistently employs hard braking while driving may receive a more favorable safety performance evaluation than a driver who has slower reflexes, has weaker eyesight, and who similarly employs hard braking. Additional examples are provided below.

Evaluations made by the driver evaluation module 134 can also be used to customize feedback. The dynamic feedback module 136 receives the evaluation from the driver evaluation module 134, determines how to provide feedback to the driver, and sends the feedback to the vehicle on-board system 104 (i.e., for in-vehicle feedback) and/or to the out-of-vehicle feedback system 108 (i.e., for out-of-vehicle feedback). The selection of feedback mode and messages based on the dynamic driver profile is described further in relation to FIG. 3.

Out-of-Vehicle Feedback System

The out-of-vehicle feedback system 108 relays feedback outside of the vehicle (i.e., out-of-vehicle feedback) to the driver, or to a guardian or supervisor of the driver. The out-of-vehicle feedback system 108 includes one or more of four components for delivering feedback by the out-of-vehicle mode class: a mailbox 138, a fax machine 140, a telephone 142, and a computer 144. Each component of the out-of-vehicle feedback system 108 represents a different presentation option for providing out-of-vehicle feedback to the driver. Similar to in-vehicle feedback, out-of-vehicle feedback can be provided by different timing options, such as daily, weekly, semi-weekly, monthly, etc. Out-of-vehicle feedback may also be provided on an event-driven basis. For example, out-of-vehicle feedback may be provided upon detection of a threshold level of dangerous or exemplary driving behavior. The out-of-vehicle feedback that is provided to the driver via the out-of-vehicle feedback system 108 can take into account the safety performance of the driver as evaluated over a time period of two or more driving episodes.

Insurance System

Data collected and analyzed by the vehicle on-board system 104 and the driver evaluation system 106 is relayed to the insurance system 110 via the network 102. The insurance system is operated by an insurance company insuring the vehicle. The insurance system 110 employs the data to determine what changes, if any, should be applied to the driver's automobile insurance. The insurance system 110 includes a front-end server 146, a dynamic storage device 148, back-end insurance systems 150, and an insurance processor 152. The front-end server 146 exchanges data from the storage device 148, back-end insurance systems 150, and the insurance processor 152. In addition, the front-end server 146 exchanges data over the network 102, e.g., to the vehicle on-board system 104, the out-of-vehicle feedback system 108, and/or the driver evaluation system 106. Back-end insurance systems 150 handle insurance-related tasks, such as claims processing, billing, payroll, etc., that fall outside the scope of this invention. The insurance processor 152 includes a business rules module 154 and optionally a dynamic feedback module 156. In implementations in which the insurance processor 152 includes a dynamic feedback module 156, its functionality is substantially similar to the functionality of the dynamic feedback module 136. The business rules module 154 uses the safety performance evaluation of the driver as determined by the dynamic feedback module 156 or 136 in order to determine whether features, if any, of an insurance policy should be adjusted. Examples of adjustments include adjusting the driver's insurance premium, adjusting a deductible, changing a level of accident forgiveness, adjusting a dividend to be paid to the driver, and canceling insurance. The business rules module 154 may also use the safety performance evaluation to identify non-insurance related incentives to offer drivers.

Figure 2:
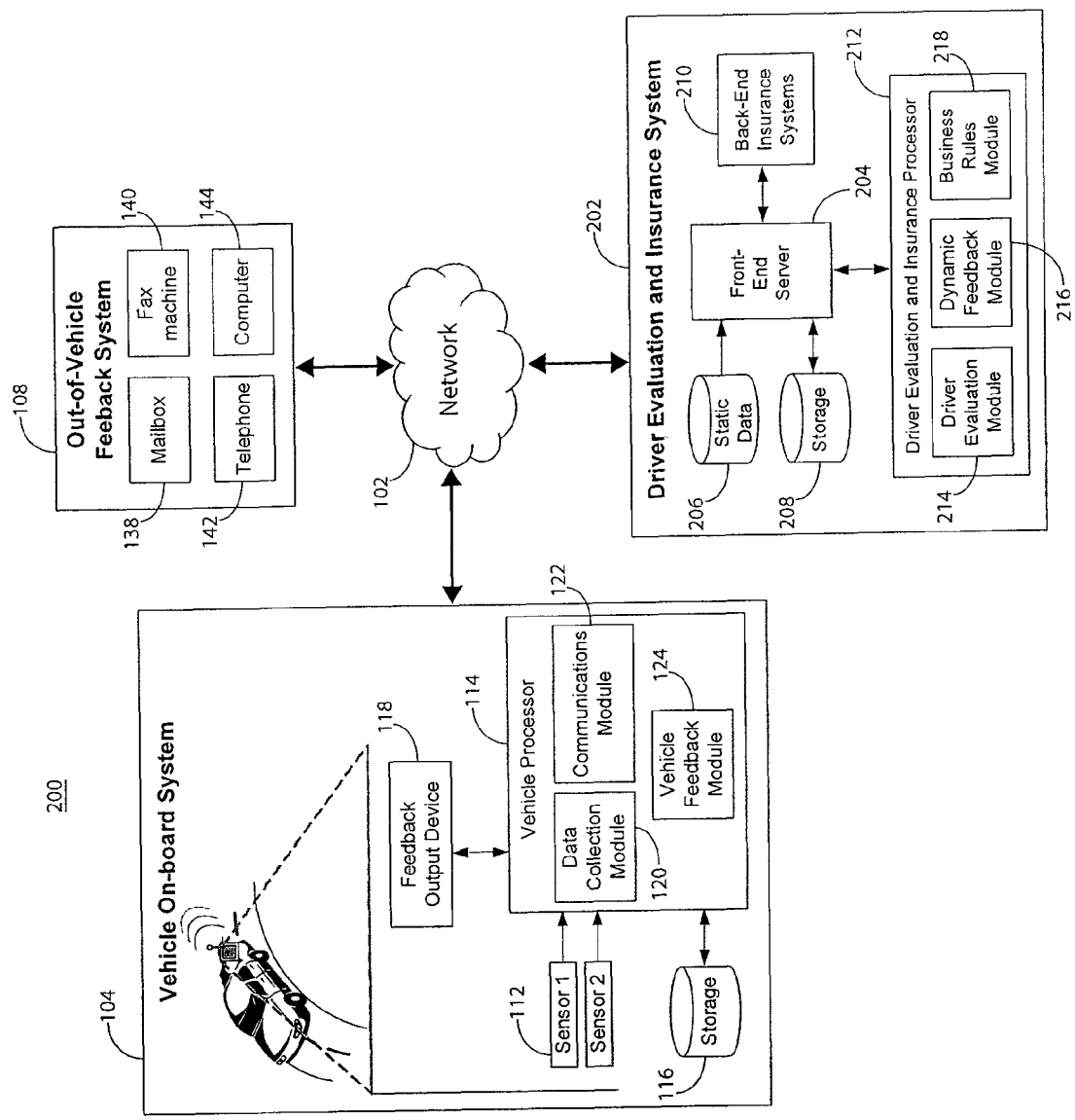
FIG. 2 is a block diagram of an alternative system for monitoring and evaluating a driver's safety performance and using that data to provide feedback and adjust the driver's automobile insurance.

FIG. 2 is a block diagram similar to FIG. 1 showing a second system 200 for monitoring a driver's driving behavior, according to an illustrative embodiment of the invention. In contrast to the system 100, the second system 200 represents an insurance system in which the insurance company controls both the safety evaluation as well as the insurance-related aspects of the system. In addition, in system 200, the driver evaluation system 106 and the insurance system 110 are combined into a single system, namely the driver evaluation and insurance system 202. Thus, insurance system 200 includes three components instead of four that are linked together by a network 102: a vehicle on-board system 104, an out-of-vehicle feedback system 108, and a driver evaluation and insurance system 202. The network 102, vehicle on-board system 104, and the out-of-vehicle feedback system 108 of system 200 have identical components and functions as described for system 100 in FIG. 1. The driver evaluation and insurance system 202 includes a front-end server 204, a static data store 206, a dynamic storage device 208, back-end insurance systems 210, and a driver evaluation and insurance processor 212. The front end server 204 obtains driving data from the network 102, the static data store 206, and the dynamic storage device 208, and back-end insurance systems 210 and provides it to the driver evaluation and insurance processor 212 for processing. In addition, the front-end server 204 sends data over the network 102, e.g., to the vehicle on-board system 104 and the out-of-vehicle feedback system 108. Back-end insurance systems 210 function as described in FIG. 1.

The driver evaluation and insurance processor 212 includes a driver evaluation module 214, a dynamic feedback module 216, and a business rules module 218. The driver evaluation module 214 functions similarly to the driver evaluation module 134 in system 100. The dynamic feedback module 216 functions similarly to the dynamic feedback module 136 in system 100. The business rules module 218 uses the safety performance evaluation of the driver as determined by the dynamic feedback module 216 in order to determine whether features of an insurance policy, if any, should be adjusted, or if non-insurance-related incentives should be offered as described in FIG. 1.

Figure 3:
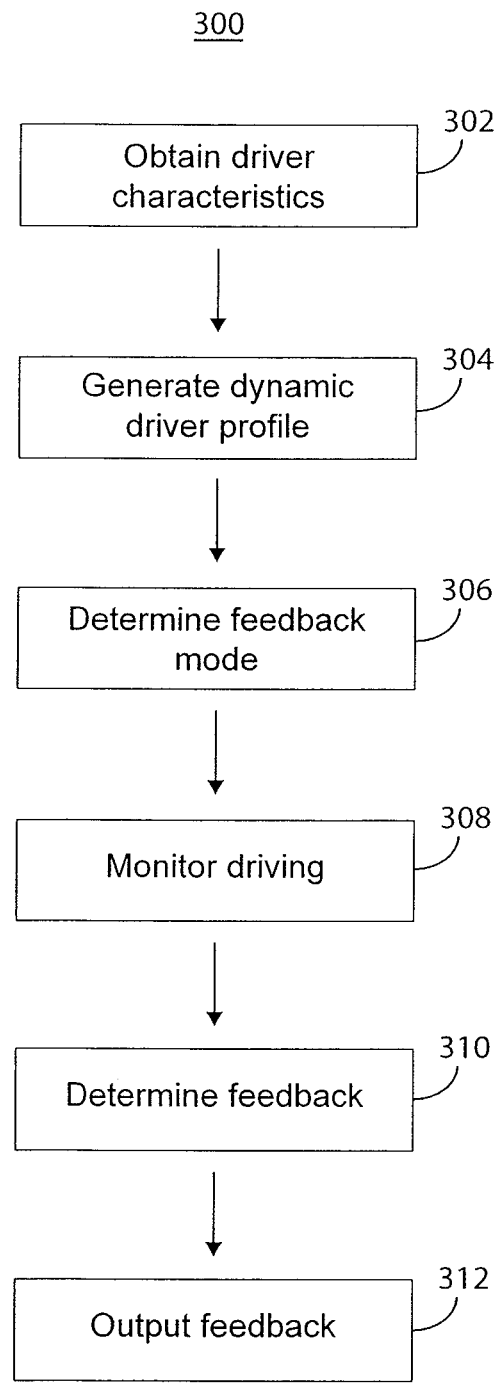
FIG. 3 is a flow chart of a method of outputting feedback, according to an illustrative embodiment of the invention.

FIG. 3 depicts a method 300 of outputting feedback as may be implemented by system 100 of FIG. 1. The method 300 begins with obtaining driver characteristics (step 302), including rating and non-rating characteristics and preferences as described above. The rating and non-rating characteristics may include safety-related demographic and individual characteristics of the driver as described above. The rating and non-rating characteristics may obtained for example, from a paper or web-based questionnaire completed by the driver, upon registering for a monitoring/feedback service. Safety-related demographic characteristics may include, for example, the age of the driver, gender of the driver, occupation of the driver, and the driver's place of residence and/or employment. Additional rating and/or non-rating characteristics may likewise be obtained, for example, when the driver enters into a monitoring service contract. The characteristics can be derived through a questionnaire, a medical diagnostic evaluation performed by a medical practitioner, and/or by requesting and reviewing driver medical records. Safety-related individual characteristics of the driver may include, for example, analyses of eyesight, cognitive ability (such as reaction time and perception skills), physical fitness, and other indicators of health and fitness.

After the driver characteristics are identified (step 302), the driver evaluation module 134 of the driver evaluation system 106 generates a dynamic driver profile (step 304). The dynamic driver profile includes at least one rating characteristic and at least one non-rating characteristic of the driver as described above.

Next, the feedback mode is determined (step 306) by the dynamic feedback module 136 of the driver evaluation processor 132 based on the dynamic driver profile. The feedback mode is the method by which feedback is relayed to the driver. The feedback mode may utilize any one of the components of the out-of-vehicle feedback system 108, including a mailbox 138, fax machine 140, telephone 142, and computer 144, or a combination thereof. Furthermore, in-vehicle feedback may be provided in the vehicle via the feedback output device 118 using different feedback modes, including, for example, real-time audio feedback, real-time visual feedback, pre-ride audio feedback, pre-ride visual feedback, post-ride audio feedback, post-ride visual feedback, and/or combinations thereof. As described above, the feedback may include an analysis of the driver's driving behavior, an instruction for the driver to alter his or her driving behavior, and/or an incentive to adjust or maintain driving behaviors. Incentives from an insurer may include reducing the driver's insurance premium, reducing a deductible, changing a level of accident forgiveness, increasing a dividend to be paid to the driver, or renewing insurance. Additional incentives such as discounts on goods and services may also be offered by other parties (e.g., an employer or fleet supervisor). The dynamic driver profile can be used to determine a feedback mode that is appropriate for the driver. As indicated above, the mode of feedback selected to provide feedback to the driver is based at least in part on his or her dynamic driving profile, including rating and non-rating characteristics of the driver. The driver feedback module 134 may also base its selection of the feedback mode on the preferences, so long as not contraindicated for safety reasons, as described above. The following examples illustrate how the method 300 determines an in-vehicle feedback mode based on the rating and non-rating characteristics of the driver:

Consider Driver 1, a hearing-impaired but otherwise healthy male driver. Real-time in-vehicle feedback is not contraindicated for such healthy individuals. Audio feedback is likely to have limited benefits for a hearing impaired driver. Thus, the dynamic feedback module 136 of the driver evaluation processor 132 selects a real-time visual feedback mode for providing feedback to Driver 1.

Consider Driver 2, a similarly hearing-impaired driver who, based on the driver's rating and non-rating characteristics, is more likely to be readily distracted than other drivers. Real-time feedback may cause a greater level of distraction to Driver 2, and therefore is contraindicated. Thus for Driver 2, the dynamic feedback module 136 selects a post-ride or pre-ride visual feedback mode for in-vehicle feedback.

Consider Driver 3, a driver having either a medical condition which contraindicates the use of real-time feedback or who has explicitly stated a specific aversion to the use of real-time feedback. Therefore, for Driver 3, the dynamic feedback module 136 also selects a post-ride or pre-ride feedback mode. However, as the driver is not known to have any sensory deficiencies, the feedback may be provided via an audio-visual feedback mode.

Consider Driver 4, who has expressed a preference not to receive real-time video feedback because the driver is concerned about the video feedback posing a distraction. Thus, real-time feedback sent to Driver 4 would be in the form of audio real-time feedback.

Consider Driver 5, who has expressed a preference not to receive real-time feedback. In this case, feedback may be provided to Driver 5 via a pre-ride or post-ride feedback mode.

Consider Drive 6, who is an employee of a transportation company. The supervisor of the fleet of Driver 6 has expressed a preference that Driver 6 receive real-time feedback to alert Driver 6 when the driver changes lanes excessively. Thus, if Driver 6 changes lanes excessively, the driver will receive real-time feedback that features an alert to avoid excessive lane changing.

Consider Driver 7, whose guardian has expressed a preference that Driver 7 receive real-time feedback when Driver 7 exceeds the speed limit. Thus, Driver 7 may receive a warning that the driver's speed exceeds the speed limit in the form of audio or visual feedback in a real-time feedback mode.

Consider Driver 8, a driver who has expressed a preference to improve fuel economy while driving. Thus, Driver 8 may receive real-time feedback alerting the driver that the current fuel economy is the same or worse than that previously measured. If Driver 8's driving results in improved fuel economy, Driver 8 may receive congratulatory feedback notifying the driver of their driving behavior. In either case, the feedback mode may be, for example, real-time or post-ride.

Consider Driver 9, who has expressed a preference to not exceed a particular mileage within a given period of time. Driver 9 may receive feedback notifying the driver of the number of miles driven and/or the number of miles remaining in the time period in accordance with the mileage stated in the preference. The feedback may be pre-ride, real-time, post-ride, or periodic.

Selection of an out-of-vehicle feedback mode may also be based in part on demographic and individual driver characteristics. After determining the mode of feedback (step 306) the system 100 monitors driving (step 308) of the driver via the sensors 112 of the vehicle on-board system 104. The sensors 112 track vehicle event and behavioral data related to driver's performance. Examples of data tracked by sensors include location, the vehicle's position relative to other vehicles or obstacles, acceleration, speed, braking, cornering, status of the seatbelts (i.e., engaged or not engaged) and airbags (i.e., deployed or not deployed), lane changing, distance of trip, light level, time of day, climate conditions, road type (e.g., highway, city street, rural route), road conditions, and obedience to speed limits.

Next, the driver evaluation processor 132 of the driver evaluation system 106 of system 100 determines the feedback (step 310) to be sent to the driver. The specific feedback given is derived in part on the dynamic driver profile of the driver, including rating and/or non-rating characteristics of the driver, as well as preferences expressed by the driver, the driver's guardian, and/or the driver's supervisor. Driving behavior by individuals with different combinations of rating and non-rating characteristics pose different risks. Consider the following illustrative feedback rules suitable for implementation by the driver evaluation processor 132:

Night vision may be problematic for certain individuals with, for example, severe myopia and/or cataracts or other similar conditions. As a result, night driving is relatively riskier for these individuals. Thus, thresholds applied for providing warnings to these drivers are lowered at night, whereas such thresholds remain constant or are lowered to a lesser degree for other drivers.

Tailgating, among other behaviors, is riskier for individuals with slower reaction times than those with faster reaction times. Thus, feedback to increase a separation distance with respect to another vehicle will be triggered beginning at a greater distance and/or a lower speed for those with decreased reaction times than for drivers with normal reaction times.

Driving at increased speed is riskier for drivers with poor vision and/or poor reaction times in comparison to those with perfect vision and normal reaction times. Thus, drivers with poor eyesight are alerted to slow down at lower speeds (e.g., at or near the posted speed limit) than those with perfect eyesight (e.g., at five or ten miles per hour above the posted speed limit).

In one embodiment, feedback and feedback thresholds may also be adjusted based on other real-time data, including road and/or weather conditions.

In the final step, the front-end server 126 of the driver evaluation system 106 outputs the feedback (step 312) to the driver, e.g., by forwarding in-vehicle feedback to the vehicle on-board system 104 or out-of-vehicle feedback to the out-of-vehicle feedback system 108, along with the selected timing and presentation instructions.

The above described method 300 is described as being carried out by system 100. In alternative systems, the method 300 can be carried out by the equivalent components of system 200.

Figure 4:
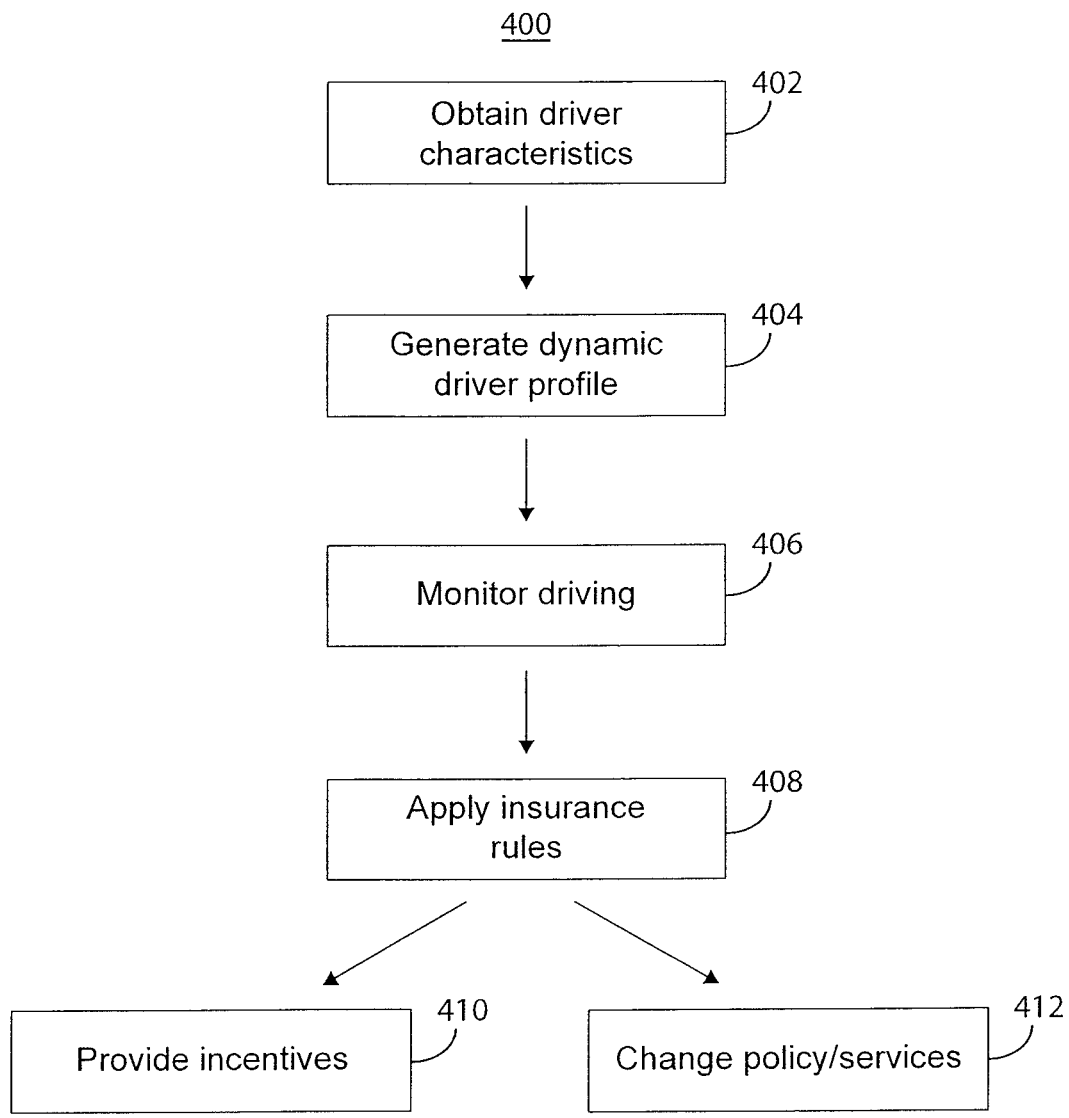
FIG. 4 is a flow chart of a method of applying insurance rules, according to an illustrative embodiment of the invention.

FIG. 4 depicts a method of an insurance company applying insurance rules to behavioral or safety information obtained from the vehicle on-board system 104 by system 200 of FIG. 2. The method 400 begins by obtaining driver characteristics (step 402) of the driver, including rating characteristics and non-rating characteristics and preferences as described above as described in FIG. 3 and inputting the characteristics into the driver evaluation and insurance system 202 via the front-end server 204 of the driver evaluation and insurance system 202.

After obtaining the driver characteristics (step 402), the driver evaluation module 214 of the driver evaluation and insurance system 202 generates a dynamic driver profile (step 404) as described above.

After generating the dynamic driver profile (step 404) the system 200 monitors driving (step 406) of the driver via sensors 112 of the vehicle on-board system 104 which track vehicle event and behavioral data related to driver's performance as described above.

In response to the monitoring the driving of the driver (step 406), the business rules module 218 of the driver evaluation and insurance processor 212 applies insurance rules (step 408) to safety evaluations output by the driver evaluation module 214. The insurance rules may result in the driver's being provided incentives to maintain or alter his or her driving behavior (step 410) and/or a change in the insurance policy and/or services (step 412) such as those described above. As the feedback relayed to the driver depends upon the rating characteristics of the driver (as discussed in the examples above), said rating characteristics similarly affect insurance adjustment determinations.

The above described method 400 is described as being carried out by system 200. In alternative systems, the method 400 can be carried out by the equivalent components of system 100.

Figure 5:
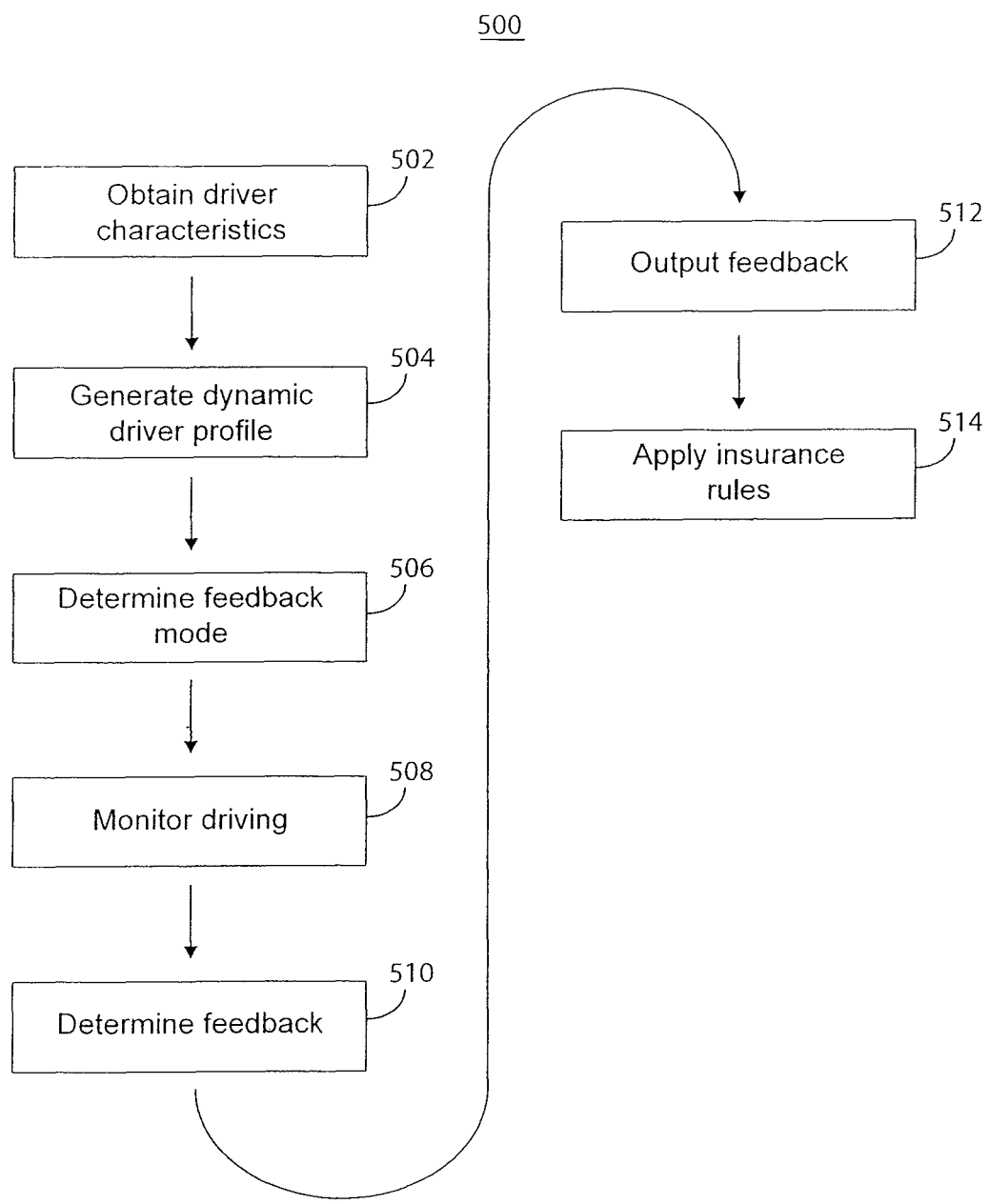
FIG. 5 is a flow chart of a method of outputting feedback and applying insurance rules, according to an illustrative embodiment of the invention.

FIG. 5 depicts a method which combines the steps of FIGS. 3 and 4 for outputting feedback and applying insurance rules by system 200 of FIG. 2. The method 500 begins with obtaining driver characteristics (step 502) of the driver, including rating and non-rating characteristics and preferences (e.g., driver, guardian, or supervisor preferences), as described above and inputting the driver characteristics via the front-end server 204 of the driver evaluation and insurance system 202.

After obtaining the driver characteristics (step 502), the driver evaluation module 214 of the driver evaluation and insurance processor 212 generates a dynamic driver profile (step 504) as described above.

Next, the driver evaluation and insurance processor 212 of the driver evaluation and insurance system 202 determines the feedback mode (step 506). The driver evaluation and insurance processor 212 selects timing and presentation instructions for both in-vehicle and out-of-vehicle classes of feedback. After determining the mode of feedback (step 506), the system 200 monitors the driving of the driver via the sensors 112 of the vehicle on-board system 104 (step 508). The sensors 112 track vehicle event and behavioral data as described above. The driver evaluation and insurance processor 212 of the driver evaluation and insurance system 202 then determines feedback to present to the driver as described above (step 510). The front-end server 204 of the driver evaluation and insurance system 202 then outputs the feedback (step 512) to the driver along with an indication of the selected feedback mode, including timing and presentation instructions. In the final step, the driver evaluation and insurance processor 212 of the driver evaluation and insurance system 202 applies insurance rules (step 514) as described in FIG. 4 to determine insurance policies adjustment and/or incentive provision decisions. Alternatively, the insurance policies adjustment and/or incentive provision decisions are made prior to feedback being output, so that the results of such decisions can be included in the feedback.

The above described method 500 is described as being carried out by system 200. In alternative systems, the method 500 can be carried out by the equivalent components of system 100.

Figure 6:
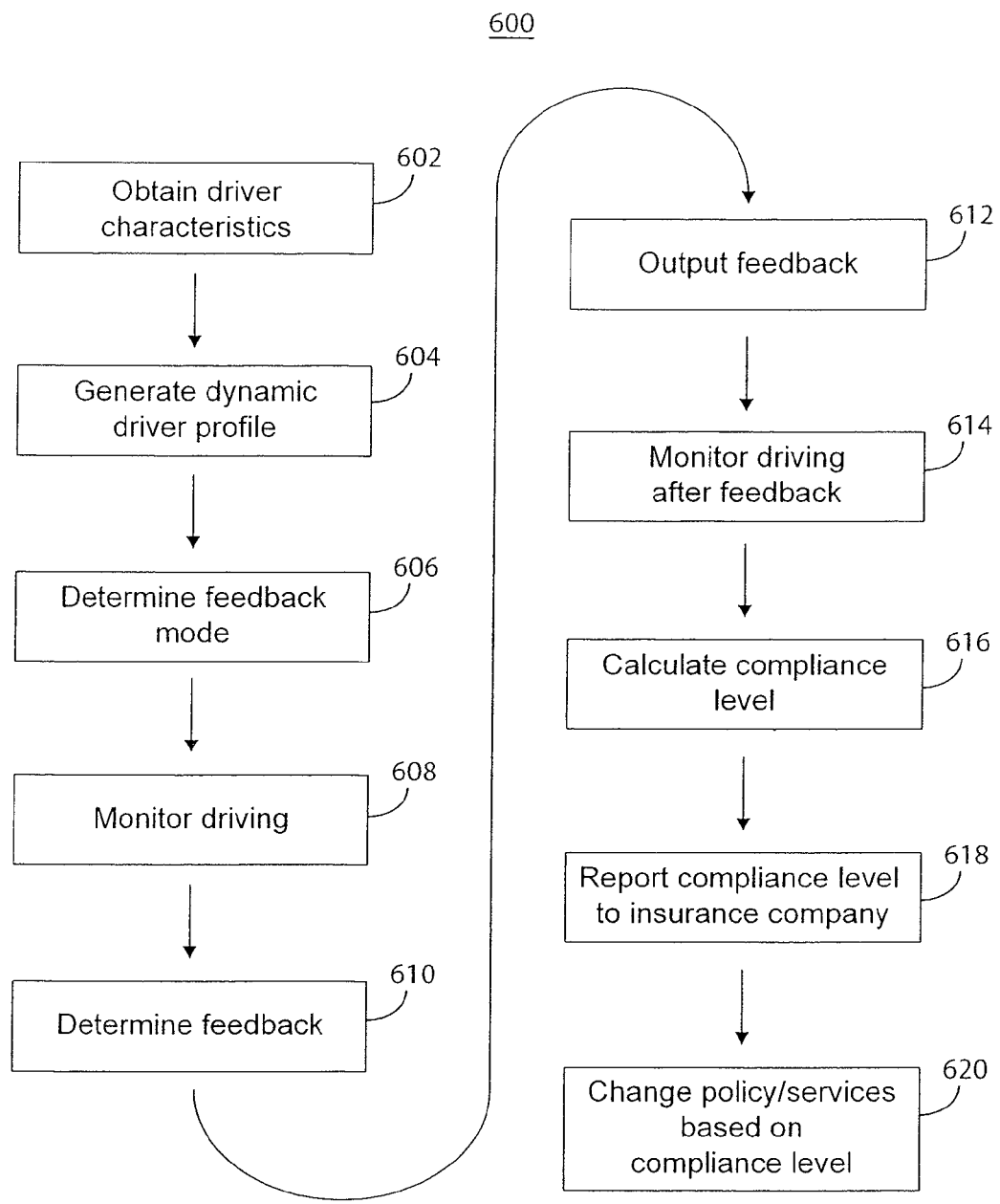
FIG. 6 is a flow chart of a method of outputting feedback, monitoring driving after feedback, and changing the insurance policy/services based on a calculated compliance level.

FIG. 6 depicts a method that is similar to the method of FIG. 5. However, instead of the insurance policy's being adjusted based directly on the safety evaluation, adjustments are based on a driver's level of compliance with instructions included in feedback messages. Steps 602, 604, 606, 608, 610, and 612 are similar to steps 502, 504, 506, 508, 510, and 512 of method 5 as described in FIG. 5. After outputting feedback (step 612), the system 200 monitors the driving of the driver via the sensors 112 of the vehicle on-board system 104 (step 614). The sensors 112 track vehicle event and behavioral data as described above. The monitoring may take place over the course of one or more driving episodes. Next, the driver evaluation module 214 calculates a level of driver compliance (step 616), i.e., the degree with which the driver's behavior changes to comply with feedback instructions, based on the monitoring of the driving after the feedback was provided to the driver (step 614). The level of driver compliance is then sent to the front-end server 204 which relays the information to the insurance system 110 of the insurance company via the network 102. In the final step, the insurance system 110 of the insurance company change the driver's insurance policy and/or services of the policy based on the compliance level (step 620). The change may include an adjustment of the premium or deductible, a change in the cost of goods or services related to the policy. Consider the following examples.

Consider Driver 1, who receives real-time feedback alerting the driver to avoid excessive braking. After the feedback is given, the system 200 monitors the driving of Driver 1 for compliance with the alert. Driver 1 applies more even braking after receiving the alert. Thus, Driver 1 complied and is granted an increased compliance level. In response, the insurance company may alter the driver's insurance policy to reduce the cost of a deductible.

Consider Driver 2, who receives real-time feedback alerting Driver 2 to avoid tailgating. After receiving the feedback, Driver 2 increases the distance from the vehicle or vehicles ahead such that Driver 2 is no longer tailgating. Thus, Driver 2 complied and is granted an increased compliance level. In response, the insurance company may change the driver's insurance policy to decrease the driver's premium.

In an alternative embodiment, a driver's compliance level is based at least in part the degree to which user utilizes the systems described above. For example, for users who obtain out-of-vehicle feedback, the compliance level in one implementation is based on the frequency with which the user obtains the out-of-vehicle feedback. In some implementations, the reporting of monitored data can optionally be deactivated by a driver. In such implementations, the compliance level is based in part on the percentage of miles or drive time for which monitored data is provided.

Figure 7:
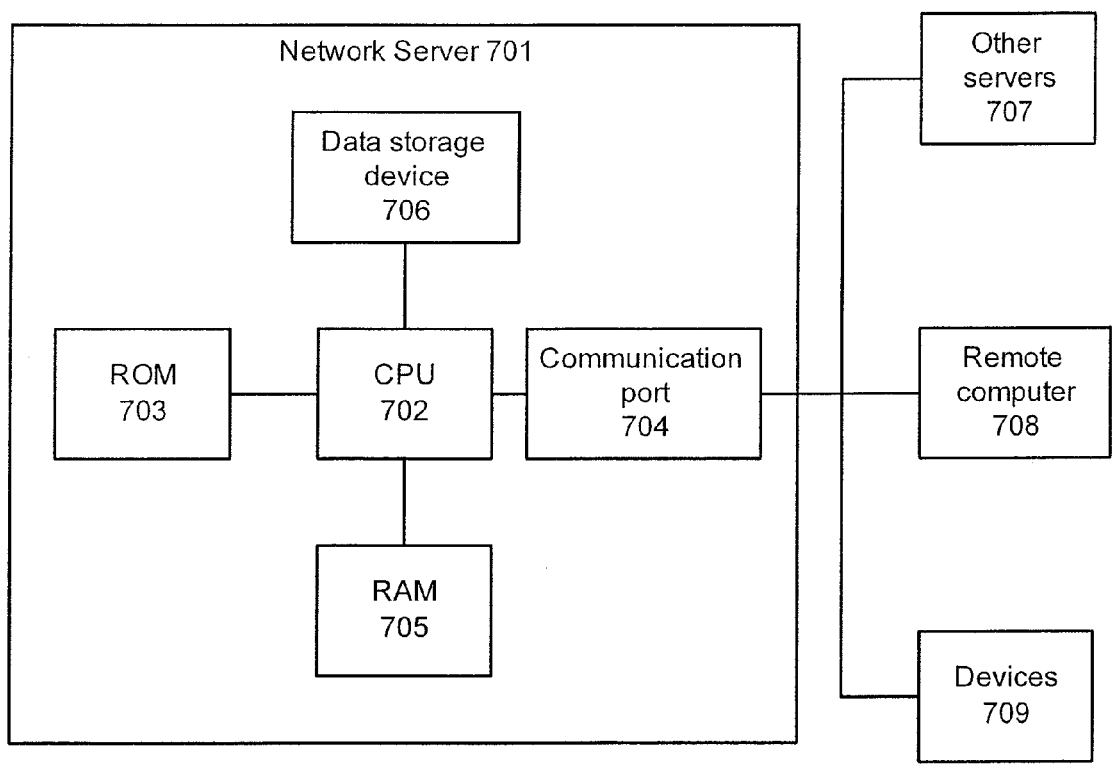
FIG. 7 is a block diagram of a computing architecture suitable for implementation of the systems of FIGS. 1 and 2, according to an illustrative embodiment of the invention.

FIG. 7 is a block diagram of a computing architecture suitable for implementing a computing device on which the insurance administration system 200 may be implemented. Computer 701 comprises at least one central processing unit (CPU) 702, at least one read-only memory (ROM) 703, at least one communication port or hub 704, at least one random access memory (RAM) 705, and one or more databases or data storage devices 706. All of these latter elements are in communication with the CPU 602 to facilitate the operation of the computer 701. The computer 701 may be configured in many different ways. For example, computer 701 may be a conventional standalone computer or alternatively, the function of computer 701 may be distributed across multiple computing systems and architectures.

Computer 701 may be configured in a distributed architecture, wherein databases and processors are housed in separate units or locations. Some such units perform primary processing functions and contain at a minimum, a general controller or a processor 702, a ROM 703, and a RAM 705. In such an embodiment, each of these units is attached to a communications hub or port 704 that serves as a primary communication link with other servers 707, client or user computers 708 and other related devices 709. The communications hub or port 604 may have minimal processing capability itself, serving primarily as a communications router. A variety of communications protocols may be part of the system, including but not limited to: Ethernet, SAP, SAS™, ATP, BLUETOOTH™, GSM and TCP/IP.

The CPU 702 comprises a processor, such as one or more conventional microprocessors and one or more supplementary co-processors such as math co-processors. The CPU 702 is in communication with the communication port 704 through which the CPU 702 communicates with other devices such as other servers 707, user terminals 708, or devices 709. The communication port 704 may include multiple communication channels for simultaneous communication with, for example, other processors, servers or client terminals. Devices in communication with each other need not be continually transmitting to each other. On the contrary, such devices need only transmit to each other as necessary, may actually refrain from exchanging data most of the time, and may require several steps to be performed to establish a communication link between the devices.

The CPU 702 is also in communication with the data storage device 706. The data storage device 706 may comprise an appropriate combination of magnetic, optical and/or semiconductor memory, and may include, for example, RAM, ROM, flash drive, an optical disc such as a compact disc and/or a hard disk or drive. The CPU 702 and the data storage device 706 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wired medium or combination of the foregoing. For example, the CPU 702 may be connected to the data storage device 706 via the communication port 704.

The data storage device 706 may store, for example, (i) a program (e.g., computer program code and/or a computer program product) adapted to direct the CPU 702 in accordance with the present invention, and particularly in accordance with the processes described in detail with regard to the CPU 702; (ii) databases adapted to store information that may be utilized to store information required by the program. Suitable databases include the static data stores and dynamic storage devices of FIGS. 1 and 2.

The program may be stored, for example, in a compressed, an uncompiled and/or an encrypted format, and may include computer program code. The instructions of the program may be read into a main memory of the processor from a computer-readable medium other than the data storage device 706, such as from a ROM 703 or from a RAM 705. While execution of sequences of instructions in the program causes the processor 702 to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as generating dynamic driver profiles, evaluating driver behavior, selecting feedback modes, and generating feedback. The program also may include program elements such as an operating system, a database management system and "device drivers" that allow the processor to interface with computer peripheral devices 709 (e.g., a video display, a keyboard, a computer mouse, etc.).

The term "computer-readable medium" as used herein refers to any medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to the processor 702 (or any other processor of a device described herein) for execution. For example, the instructions may initially be borne on a magnetic disk of a remote computer 708. The remote computer 708 can load the instructions into its dynamic memory and send the instructions over an Ethernet connection, cable line, or even telephone line using a modem. A communications device 704 local to a computing device (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

The invention may be embodied in other specific forms without departing from the spirit or essential characteristics thereof. The forgoing embodiments are therefore to be considered in all respects illustrative, rather than limiting of the invention.

What is claimed is:
1. A driver feedback system, comprising:
(a) a data storage device storing a dynamic driver profile for a specific driver, wherein the dynamic driver profile includes:
  i. at least one rating characteristic of the driver, including at least one rating characteristic related to the driver's driving behavior recorded by a vehicle monitoring system on a vehicle; and
  ii. a plurality of non-rating characteristics of the driver, the non-rating characteristics excluding driving data, the non-rating characteristics comprising at least an eyesight quality characteristic and at least one of driver preferences, guardian preferences and supervisor preferences;
(b) at least one computer processor configured to execute:
  i. a driver evaluation module for:
    receiving driving data from the vehicle monitoring system on the vehicle, the driving data comprising driver behavioral data sensed by sensors on the vehicle comprising data indicative of one or more of hard braking, tailgating, lane changing, and speed relative to speed limit;
    determining a safety performance evaluation of the driver based on (i) the driver behavioral data, (ii) the rating characteristics, including the rating characteristic related to the driver's driving behavior in the driver's associated dynamic driver profile, and (iii) the non-rating characteristics in the driver's associated dynamic driver profile;
    generating driving feedback responsive to the driver behavioral data and based on the safety performance evaluation; and
    updating the dynamic driver profile in the data storage device based on the safety performance evaluation;
  ii. a business rules module for adjusting features of an insurance policy for a driver based on the rating characteristics in the driver's dynamic driver profile and the safety performance evaluation for the driver output by the driving evaluation module; and
(c) a processor configured to execute a dynamic feedback module for:
  selecting a feedback mode from a plurality of feedback modes for a driver, the feedback modes comprising at least an in-vehicle feedback mode and an out-of-vehicle feedback mode, based on the received driving data from the vehicle monitoring system;
  responsive to selection of the out-of-vehicle feedback mode:
    generating at least one of a fax, a voice message, or an email message corresponding to the feedback generated by the driver evaluation module; and
    transmitting the at least one of the fax, the voicemail message, and the email message to the driver; and
  responsive to selection of the in-vehicle feedback mode:
    generating at least one of real-time audio feedback data, real-time visual feedback data, pre-ride audio feedback data, pre-ride visual feedback data, post-ride audio feedback data, and post-ride visual feedback data corresponding to the feedback generated by the driver evaluation module; and
    transmitting, to the vehicle monitoring system on the vehicle, the at least one of the real-time audio feedback data, the real-time visual feedback data, the pre-ride audio feedback data, the pre-ride visual feedback data, post-ride audio feedback data, and post-ride visual feedback data, for output on a feedback output device on the vehicle;

wherein the non-rating characteristics comprise driver reaction time, and wherein the driver evaluation module is further for providing feedback to increase a separation distance between a driver's vehicle and a preceding vehicle, triggered based on a threshold separation distance, the threshold separation distance being based on the driver reaction time for the driver stored in the dynamic driver profile.

2. The driver feedback system of claim 1, comprising a server for sending the generated feedback to the driver.

3. The driver feedback system of claim 1, wherein for two drivers having the same driving behavioral data, the driver evaluation module, when executed by the at least one processor, is configured to generate different feedback based on the two drivers' respective rating and non-rating characteristics.

4. The driver feedback system of claim 1, wherein the data storage device stores at least a second dynamic driver profile for a second driver, wherein the second dynamic profile includes at least one rating characteristic that was a non-rating characteristic in the dynamic driver profile.

5. The driver feedback system of claim 1, wherein the at least one rating characteristic includes at least one of age, gender, driving record, compliance with feedback, annual mileage driven, and vehicle use.

6. The driver feedback system of claim 1, wherein the non-rating characteristics include a health characteristic of the driver.

7. The driver feedback system of claim 1, wherein the non-rating characteristics include-perception skills of the driver.

8. The driver feedback system of claim 1, wherein the non-rating characteristics further include a health characteristic of the driver.

9. The driver feedback system of claim 1, wherein the driver evaluation module, when executed by the at least one processor, is configured to generate its evaluation based on the preferences.

10. The driver feedback system of claim 1, wherein the plurality of feedback modes includes at least one of a real-time feedback mode, a post-ride feedback mode, a pre-ride feedback mode, and a periodic feedback mode.

11. The driver feedback system of claim 10, wherein in response to the driver having a first combination of rating and non-rating characteristics, the dynamic feedback module, when executed by the at least one processor, is configured to select a real-time feedback mode for providing feedback to the driver.

12. The driver feedback system of claim 11, wherein in response to the driver having a second combination of rating and non-rating characteristics, the dynamic feedback module, when executed by the at least one processor, is configured to select a periodic feedback mode for providing feedback to the driver.

13. The driver feedback system of claim 11, wherein in response to the driver having a second combination of rating and non-rating characteristics, the dynamic feedback module, when executed by the at least one processor, is configured to select a post-ride feedback mode for providing feedback to the driver.

14. The driver feedback system of claim 1, wherein the driver evaluation module, when executed by the at least one processor, is configured to determine the safety performance evaluation of the driver by comparing driving behavior data of the driving data to data stored in the associated dynamic driver profile.

15. The driver feedback system of claim 1, further comprising a server for receiving a communication at least one of a rating characteristic and a non-rating characteristic of the driver from a sensor located on the vehicle and forwarding the received rating characteristic and non-rating characteristic to the driver evaluation module which, when executed by the at least one processor, is configured to update the dynamic driver profile.

16. The driver feedback system of claim 1, wherein the feedback includes an analysis of the driver's driving behavior.

17. The driver feedback system of claim 1, wherein the feedback includes an incentive.

18. The driver feedback system of claim 17, wherein the incentive comprises a reduced premium for the insurance policy.

19. The driver feedback system of claim 17, wherein the incentive comprises a reduced deductible for the insurance policy.

20. The driver feedback system of claim 1, wherein the feedback includes an instruction for the driver to alter the driver's driving behavior.

21. The driver feedback system of claim 20, wherein the driver evaluation module, when executed by the at least one processor, is configured to output a compliance level based on a driver's adherence to the driving instruction.

22. The driver feedback system of claim 20, wherein the business rules module, when executed by the at least one processor, is configured to modify the insurance policy based on the compliance level.

23. The driver feedback system of claim 22, wherein the modification comprises an adjustment to a premium associated with the insurance policy.

24. The driver feedback system of claim 22, wherein the modification comprises an adjustment to a deductible associated with the insurance policy.

25. The driver feedback system of claim 1, wherein the driver evaluation module is configured to, responsive to receipt of driving data indicative of consistent hard braking, for a driver having non-rating characteristics in the driver's associated dynamic driver profile comprising quick reflexes and good eyesight, determine a first safety performance evaluation, and, for a driver having non-rating characteristics in the driver's associated dynamic driver profile comprising slower reflexes and weaker eyesight, determine a second safety performance evaluation less favorable than the first safety performance evaluation.

26. A method comprising:
   storing, by a data storage device, a dynamic driver profile for a specific driver, wherein the dynamic driver profile includes:
      i. at least one rating characteristic of the driver, including at least one rating characteristic related to the driver's driving behavior recorded by a vehicle monitoring system on a vehicle; and
      ii. a plurality of non-rating characteristics of the driver, the non-rating characteristics excluding driving data, the non-rating characteristics comprising an eyesight quality characteristic and at least one of driver preferences, guardian preferences and supervisor preferences;
   receiving, by a processor configured to execute a driver evaluation module, driving data from the vehicle monitoring system on the vehicle, the driving data comprising driver behavioral data sensed by sensors on the vehicle comprising data indicative of one or more of hard braking, tailgating, lane changing, and speed relative to speed limit;

evaluating, by the processor configured to execute a driver evaluation module, the safety performance of the driver based on (i) the driver behavioral data, (ii) the rating characteristics, including the rating characteristic related to the driver's driving behavior in the driver's associated dynamic driver profile, and (iii) the non-rating characteristics in the driver's associated dynamic driver profile;

generating, by the processor configured to execute the driver evaluation module, driving feedback based on the evaluation;

updating, by the processor configured to execute the driver evaluation module, the dynamic driver profile in the data storage device based on the safety performance evaluation;

adjusting, by a processor configured to execute a business rules module, features of an insurance policy for a driver based on the rating characteristics in the driver's dynamic driver profile and the safety performance evaluation for the driver output by the driving evaluation module;

selecting, by a processor configured to execute a dynamic feedback module, a feedback mode from a plurality of feedback modes for a driver, the feedback modes comprising at least an in-vehicle feedback mode and an out-of-vehicle feedback mode, based on the received driving data from the vehicle monitoring system;

responsive to selection of the out-of-vehicle feedback mode:
generating, by the processor configured to execute the dynamic feedback module, at least one of a fax, a voice message, or an email message corresponding to the feedback generated by the driver evaluation module; and
transmitting the at least one of the fax, the voicemail message, and the email message to the driver;

responsive to selection of the in-vehicle feedback mode:
generating at least one of real-time audio feedback data, real-time visual feedback data, pre-ride audio feedback data, pre-ride visual feedback data, post-ride audio feedback data, and post-ride visual feedback data corresponding to the feedback generated by the driver evaluation module; and
transmitting, to the vehicle monitoring system on the vehicle, the at least one of the real-time audio feedback data, the real-time visual feedback data, the pre-ride audio feedback data, the pre-ride visual feedback data, post-ride audio feedback data, and post-ride visual feedback data, for output on a feedback output device on the vehicle;

wherein the non-rating characteristics comprise driver reaction time, and further comprising providing, by the driver evaluation module, feedback to increase a separation distance between a driver's vehicle and a preceding vehicle, triggered based on a threshold separation distance, the threshold separation distance being based on the driver reaction time for the driver stored in the dynamic driver profile.

27. The method of claim 26, comprising receiving, by a server, a communication of a driving characteristic from a sensor located on the vehicle and forwarding the received driving characteristic to the data storage device to update the dynamic driver profile.

28. The method of claim 26, wherein the feedback includes an analysis of the driver's driving behavior.

29. The method of claim 26, comprising generating, by the processor configured to execute the driver evaluation module, for two drivers having the same driving behavior, different feedback based on the two drivers' respective rating and non-rating characteristics.

30. The method of claim 26, comprising generating, by the processor configured to execute the driver evaluation module, the evaluation based on the preferences.

31. The method of claim 26, wherein the feedback includes an instruction for the driver to alter the driver's driving behavior.

32. The method of claim 26, comprising:
outputting, by the processor configured to execute the driver evaluation module, a compliance level based on a driver's adherence to the driving instruction; and
modifying, by the processor configured to execute the business rules module, the insurance policy based on the compliance level.

33. A driver feedback system, comprising:
(a) a data storage device storing a dynamic driver profile for a specific driver, wherein the dynamic driver profile includes:
i. at least one rating characteristic of the driver, including at least one rating characteristic related to the driver's driving behavior recorded by a vehicle monitoring system; and
ii. a plurality of non-rating characteristics of the driver, the non-rating characteristics excluding driving data, the non-rating characteristics comprising at least an eyesight quality characteristic and at least one of driver preferences, guardian preferences and supervisor preferences;
(b) at least one computer processor configured to execute:
i. a driver evaluation module for:
receiving driving data from the vehicle monitoring system, the driving data comprising driver behavioral data comprising data indicative of one or more of hard braking, tailgating, lane changing, and speed relative to speed limit;
determining a safety performance evaluation of the driver based on the driver behavioral data, and based on the rating characteristics, including the rating characteristic related to the driver's driving behavior, and on the non-rating characteristics, in the driver's associated dynamic driver profile;
generating driving feedback responsive to the driver behavioral data and based on the safety performance evaluation; and
updating the dynamic driver profile based on the safety performance evaluation;
ii. a business rules module for adjusting features of an insurance policy for a driver based on the rating characteristics in the driver's dynamic driver profile and the safety performance evaluation for the driver output by the driving evaluation module; and
(c) a processor configured to execute a dynamic feedback module for:
selecting a feedback mode from a plurality of feedback modes for a driver, the feedback modes comprising at least an in-vehicle feedback mode and an out-of-vehicle feedback mode, based on the received driving data from the vehicle monitoring system; and
providing to the feedback generated by the driver evaluation module to the driver according to the selected mode;

wherein the non-rating characteristics comprise driver reaction time, and wherein the driver evaluation module is further for providing feedback to increase a separation distance between a driver's vehicle and a preceding vehicle, triggered based on a threshold separation distance, the threshold separation distance being based on the driver reaction time for the driver stored in the dynamic driver profile.

\* \* \* \* \*